US008724708B2

(12) United States Patent
Hashimoto

(10) Patent No.: US 8,724,708 B2
(45) Date of Patent: May 13, 2014

(54) IMAGE DECODING DEVICE, IMAGE DECODING SYSTEM, IMAGE DECODING METHOD, AND INTEGRATED CIRCUIT

(75) Inventor: Takashi Hashimoto, Hyogo (JP)

(73) Assignee: Panasonic Corporation, Osaka (JP)

(*) Notice: Subject to any disclaimer, the term of this patent is extended or adjusted under 35 U.S.C. 154(b) by 1015 days.

(21) Appl. No.: 12/597,585

(22) PCT Filed: Apr. 25, 2008

(86) PCT No.: PCT/JP2008/001089
§ 371 (c)(1),
(2), (4) Date: Nov. 10, 2009

(87) PCT Pub. No.: WO2008/139708
PCT Pub. Date: Nov. 20, 2008

(65) Prior Publication Data
US 2010/0128801 A1    May 27, 2010

(30) Foreign Application Priority Data
Apr. 27, 2007   (JP) .................................. 2007-118674

(51) Int. Cl.
*H04N 11/02* (2006.01)
*H04N 7/26* (2006.01)
*H04N 7/50* (2006.01)

(52) U.S. Cl.
CPC ... *H04N 19/00933* (2013.01); *H04N 19/00533* (2013.01); *H04N 19/00272* (2013.01); *H04N 19/000939* (2013.01); *H04N 19/00781* (2013.01); *H04N 19/00521* (2013.01); *H04N 19/00103* (2013.01); *H04N 7/50* (2013.01); *H04N 7/26335* (2013.01); *H04N 7/26946* (2013.01); *H04N 7/26244* (2013.01)
USPC ...... 375/240.25; 348/720; 348/721; 348/488; 375/240.26; 375/240.27

(58) Field of Classification Search
CPC . H04N 7/50; H04N 7/26335; H04N 7/26244; H04N 19/00933; H04N 19/00533; H04N 19/00272; H04N 19/00939; H04N 19/00781; H04N 19/00521; H04N 19/00103
USPC ........................... 375/240.25, 240.1, 240.24, 375/240.26–240.29; 348/488
See application file for complete search history.

(56) References Cited

U.S. PATENT DOCUMENTS
5,138,447 A * 8/1992 Shen et al. ............... 375/240.12
(Continued)

FOREIGN PATENT DOCUMENTS
EP       2 023 637       2/2009
(Continued)

OTHER PUBLICATIONS
Yung et al, Fast and Parallel Video Encoding by workload Balancing, 1998.*
(Continued)

*Primary Examiner* — Andy Rao
*Assistant Examiner* — Shan Elahi
(74) *Attorney, Agent, or Firm* — Wenderoth, Lind & Ponack, L.L.P.

(57) ABSTRACT

A segment allocation determination unit of an image decoding device determines an allocation of segments, in accordance with processing capabilities of the image decoding units, so that the processing times of the image decoding units are equal. When a first error detection unit detects an error, a segment allocation determination unit performs control so that the segment including the error is allocated to an image decoding unit to which a predicted reference image of the segment is allocated. When any of second error detection units detect an error, the segment allocation determination unit controls allocation of the next series of segments with consideration to a bit amount skipped due to the error. This enables providing an image decoding device that can efficiently realize decoding with a plurality of image decoding units even when an error is detected.

14 Claims, 13 Drawing Sheets

(56) References Cited

U.S. PATENT DOCUMENTS

| | | | |
|---|---|---|---|
| 5,247,363 A * | 9/1993 | Sun et al. | 348/616 |
| 5,479,447 A * | 12/1995 | Chow et al. | 375/260 |
| 5,675,424 A * | 10/1997 | Park | 358/426.07 |
| 5,787,121 A * | 7/1998 | Okamoto | 375/262 |
| 5,870,087 A * | 2/1999 | Chau | 715/202 |
| 6,212,234 B1 * | 4/2001 | Andoh et al. | 375/240.08 |
| 6,597,741 B1 * | 7/2003 | Miyazaki | 375/240.25 |
| 7,327,796 B1 * | 2/2008 | Stirling-Gallacher | 375/262 |
| 7,660,352 B2 * | 2/2010 | Yamane et al. | 375/240.12 |
| 7,715,475 B1 * | 5/2010 | Puri et al. | 375/240 |
| 8,189,688 B2 * | 5/2012 | Tomita et al. | 375/240.27 |
| 2002/0118758 A1 * | 8/2002 | Sekiguchi et al. | 375/240.18 |
| 2003/0053546 A1 * | 3/2003 | Gandhi et al. | 375/240.27 |
| 2003/0161395 A1 * | 8/2003 | Byers | 375/240.01 |
| 2004/0196905 A1 * | 10/2004 | Yamane et al. | 375/240.12 |
| 2005/0117654 A1 * | 6/2005 | Im | 375/240.26 |
| 2009/0002378 A1 | 1/2009 | Kondo | |

FOREIGN PATENT DOCUMENTS

| | | |
|---|---|---|
| JP | 10-178644 | 6/1998 |
| JP | 2003-32679 | 1/2003 |
| JP | 2005-39739 | 2/2005 |
| JP | 2005-189975 | 7/2005 |
| JP | 2006-115092 | 4/2006 |
| JP | 2007-13419 | 1/2007 |
| WO | 2007/000908 | 1/2007 |
| WO | 2007/136093 | 11/2007 |

OTHER PUBLICATIONS

International Search Report issued Aug. 12, 2008 in International (PCT) Application No. PCT/JP2008/001089.

Mastronarde, N. et al., *A Queuing-Theoretic Approach to Task Scheduling and Processor Selection for Video-Decoding Applications, IEEE Transactions on Multimedia*, vol. 9, No. 7 (Nov. 2007), pp. 1493-1507.

Seongbeom, K. et al., *Fair Cache Sharing and Partitioning in a Chip Multiprocessor Architecture, IEEE Computer Society* (2004).

Supplementary European Search Report issued Jul. 21, 2010 in European Application No. EP 08 75 1614 corresponding to the present U.S. application.

N.H.C. Yung et al., "Fast and Parallel Video Encoding by Workload Balancing", Systems, Man and Cybernetics, vol. 5, pp. 4642-4647, Oct. 11, 1998.

\* cited by examiner

FIG.5A

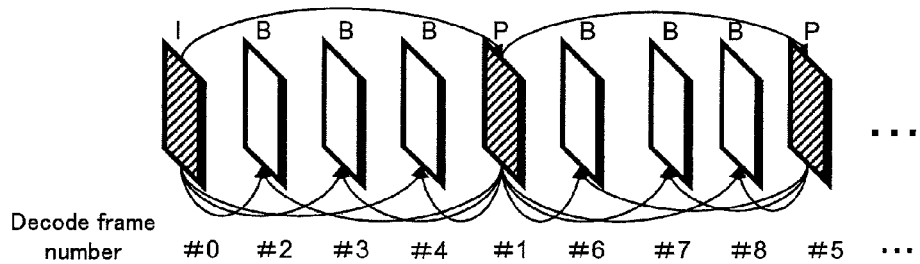

Decode frame number  #0  #2  #3  #4  #1  #6  #7  #8  #5  ...

FIG.5B

Image frame (picture)

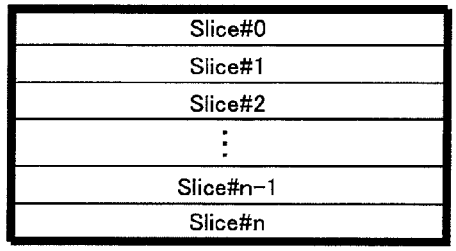

FIG.5C

| Decode frame number | Slice number | Data amount | Allocation result | First error detection position | Second error detection position |
|---|---|---|---|---|---|
| #0 | Slice#0 | 1500 Kbits | Decoder#0 | 0 | 0 |
| | Slice#1 | 1000 Kbits | Decoder#1 | 0 | 0 |
| | Slice#2 | 2600 Kbits | Decoder#1 | 0 | 0 |
| | ... | ... | ... | ... | ... |
| | Slice#n-1 | 1300 Kbits | Decoder#3 | 0 | 0 |
| | Slice#n | 2000 Kbits | Decoder#3 | 0 | 0 |
| #1 | Slice#0 | 500 Kbits | Decoder#0 | 0 | 0 |
| | Slice#1 | 300 Kbits | Decoder#1 | 0 | 0 |
| | Slice#2 | 1000 Kbits | Decoder#2 | 0 | 0 |
| | ... | ... | ... | ... | ... |
| | Slice#n-1 | 700 Kbits | Decoder#3 | 0 | 0 |
| | Slice#n | 400 Kbits | Decoder#1 | 0 | 0 |
| ... | ... | ... | ... | ... | ... |

| Decode frame number | Slice number | Data amount | Allocation result | First error detection position | Second error detection position |
|---|---|---|---|---|---|
| #0 | Slice#0 | 1500 Kbits | Decoder#0 | 0 | 0 |
| | Slice#1 | 1000 Kbits | Decoder#1 | 0 | 0 |
| | Slice#2 | 2600 Kbits | Decoder#1 | 0 | 0 |
| | ... | ... | ... | ... | ... |
| | Slice#n-1 | 1300 Kbits | Decoder#3 | 0 | 0 |
| | Slice#n | 2000 Kbits | Decoder#3 | 0 | 0 |
| #1 | Slice#0 | 500 Kbits | Decoder#1 | 0 | 0 |
| | Slice#1 | 300 Kbits | Decoder#1 | 0 | 0 |
| | Slice#2 | 1000 Kbits | Decoder#2 | 0 | 0 |
| | ... | ... | ... | ... | ... |
| | Slice#n-1 | 700 Kbits | Decoder#3 | 0 | 0 |
| | Slice#n | 400 Kbits | Decoder#1 | 0 | 0 |
| ... | ... | ... | ... | ... | ... |

| Decode frame number | Slice number | Data amount | Allocation result | First error detection position | Second error detection position |
|---|---|---|---|---|---|
| #0 | Slice#0 | 1500 Kbits | Decoder#0 | 0 | 0 |
| | Slice#1 | 1000 Kbits | Decoder#1 | 0 | 0 |
| | Slice#2 | 2600 Kbits | Decoder#1 | 0 | 0 |
| | ... | ... | ... | ... | ... |
| | Slice#n-1 | 1300 Kbits | Decoder#3 | 0 | 0 |
| | Slice#n | 2000 Kbits | Decoder#3 | 0 | 0 |
| #1 | Slice#0 | 500 Kbits | Decoder#0 | 0 | 0 |
| | Slice#1 | 300 Kbits | Decoder#1 | 0 | 0 |
| | Slice#2 | 1000 Kbits | Decoder#1 | 1 | 0 |
| | ... | ... | ... | ... | ... |
| | Slice#5 | 700 Kbits | Decoder#3 | 0 | 150 Kbits |
| | Slice#n | 400 Kbits | Decoder#1 | 0 | 0 |
| ... | ... | ... | ... | ... | ... |

IMAGE DECODING DEVICE, IMAGE DECODING SYSTEM, IMAGE DECODING METHOD, AND INTEGRATED CIRCUIT

BACKGROUND OF THE INVENTION

TECHNICAL FIELD

The present invention relates to processing for decoding video signals that have been digitally encoded. In particular, the present invention relates to decoding processing and error detection performed in a case that encoded video signals are distributed to each core or chip in image decoding devices constituted from a plurality of video signal decoding cores or chips and a plurality of memories for video signals.

BACKGROUND ART

As a representative international standard for digitally encoded video signals, there is the MPEG (Moving Picture Experts Group)-2 standard.

Also, in recent years, the H.264/AVC (Advanced Video Codec) standard and the VC-1 standard, which are new systems having a higher coding efficiency than the MPEG-2 standard, are beginning to be used in terrestrial digital broadcasting, and in devices such as players and recorders adapted for BD (Blu-Ray Disc) and HD-DVD (High Definition-DVD) standards.

Such standards are aggregations of several different standards, and are defined by profile and level. The profile shows an extent of complexity when the images are digitally encoded, and the level shows a resolution of the images.

For example, the MPEG-2 Main Profile@Main Level targets encoding of video signals according to the SDTV (Standard Definition TV) television standard. The image size of SDTV is 720 pixels per line, and 480 lines per image frame.

Meanwhile, the MPEG-2 Main Profile@High Level targets encoding of video signals that are HDTV (High Definition TV) image size. The image size of HDTV is 1920 pixels per line, and 1080 lines per image frame.

Now, in the fields of DTV (Digital Television) and DVD (Digital Versatile Disc) recorders, BD recorders etc., adaptation to large-screen for product differentiation is advancing rapidly, and the HDTV image size is becoming mainstream. Also, it is expected that in the years to come, it will be necessary to adapt to an image size exceeding the HDTV image size.

Due to such circumstances, recent microprocessor development is changing from increasing the capability of a single processor core to increasing the capability by using a multi-processor structure. For example, patent document 1 discloses technology pertaining to a moving picture decoding device that performs decoding processing by directly inputting image data that has been compressed according to MPEG-2 to a plurality of image decoders, and using the plurality of image decoders in parallel.

The moving picture decoding device of patent document 1 includes four image decoders. In accordance with values set in advance in the decoders and data amounts of the image data, the moving picture decoding device determines which image decoder is to perform processing for which image data. The moving picture decoding device of patent document 1 can realize comparatively low-cost decoding of images that are necessary for high processing ability.

Also, various technology (for example, patent document 2) has been disclosed for processing performed when an error is detected by an image decoding device. When an error that causes inability to continue decoding is included in the encoded image data, the moving picture decoding device of patent document 1 performs control to skip decoding compressed data from a position at which the error was detected to a next piece of image data, and to start decoding processing from the next piece of image data.

Patent document 1: Japanese Patent Application Publication No. H10-178644
Patent document 2: Japanese Patent Application Publication No. 2007-13419

SUMMARY OF THE INVENTION

Problems Solved by the Invention

Here, the image decoder described in patent document 1 performs decoding processing in such a way that a unit for the processing is a single slice. However, a data amount of encoded image data is different for each slice, and the processing load is different depending on the data amount of each slice. Accordingly, when using the technology disclosed in patent document 1, the processing loads of the image decoders become imbalanced.

In particular, since the newest encoding systems, such as the H.264/AVC standard and the VC-1 standard, introduce various technology for increasing coding efficiency, data amounts tend to become more imbalanced between slices.

Also, since processing to skip encoded image data is performed when an error is detected, there is a large difference in processing time between an image decoder that detects an error and an image decoder that does not detect an error.

There is a problem that the greater the imbalance in processing time between the image decoders becomes, the farther the processing ability of the image decoding device as a whole decreases.

However, patent document 1 does not disclose performing allocation in view of the imbalance in processing times between the decoders due to a difference in data amounts between the slices, and also does not describe the processing performed when an error is detected.

In view of this, the present invention has been created in view of the above problems, and an object thereof is to provide an image decoding device, image decoding method, image decoding system, and integrated circuit capable of performing efficient decoding processing using a plurality of decoders in parallel, and furthermore, continuing efficient decoding processing even when an error is detected.

In order to solve the above problem, the present invention is an image decoding device that performs decoding processing on an encoded first video signal, with use of a plurality of image decoding units connected in parallel, including an allocation control unit operable to if an error is not detected, allocate processing to the image decoding units according to a first allocation method so that processing times of the image decoding units are substantially equal, and if an error is detected, allocate processing to the image decoding units according to a second allocation method that is different from the first allocation method so that the processing times of the image decoding units are substantially equal.

Effects of the Invention

According to the above structure, the image decoding device of the present invention has been realized in view of the imbalance in processing times occurring when an error is detected. Using different allocation methods depending on whether an error is detected enables the image decoding device to perform allocation so that the processing times of the image decoding units are as equal as possible even when an error is detected, and also, of course, when an error is not detected. This enables improving processing efficiency over a conventional image decoding device.

Here, the image decoding device may include an error detection unit operable to detect an error in the first video signal; the plurality of image decoding units each having an specific processing ability, to each of which one or more segments included in the first video signal are allocated, each of which being operable to decode the allocated one or more segments, and a storage unit for storing an allocation result that is a result of the allocation performed by the allocation control unit, wherein the allocation control unit allocates the one or more segments to the image decoding units according to the processing abilities of the image processing units so that the processing times of the image processing units are substantially equal, and the allocation control unit, when an error is detected by the error detection unit, and a reference segment for a segment including the detected error has already been decoded by any of the image decoding units, according to the second allocation method, (i) acquires an allocation result of the reference segment from the storage unit, (ii) and after performing control to allocate the segment including the error to the image decoding unit to which the reference segment has been allocated, (iii) performs control to allocate the one or more segments to the image decoding units so that the processing times of the image decoding units are substantially equal.

According to this structure, the image decoding device of the present invention enables improving processing efficiency by allocating segments according to the specific processing abilities of the image decoding units, so that processing times of the respective image decoding units are equal.

Also, when an error is detected in the first video signal, the segment that includes the error is allocated to the image decoding unit to which a reference segment is allocated. This enables reducing an influence of data transfer, performed for error concealment, on the decoding processing.

Here, in the image decoding device, each of the image decoding units may include a decoding unit operable to perform decoding processing on the allocated one or more segments, an error detection unit operable to detect an error in a segment when the decoding unit is performing decoding processing on the segment, and an error notification unit operable to, when the error detection unit detects the error, notify the position of the detected error to the storage unit, and the storage unit may further store the position of the error notified by the error notification unit, the allocation control unit may, when the position of the error has been stored in the storage unit, in accordance with the position of the error and the processing abilities of the image decoding units, allocate the one or more segments to the image decoding units so that the processing times of processing by the image decoding units are substantially equal.

According to this structure, when an error is detected in the decoding of a segment by each of the image decoding units, by performing control to cause the processing times of the image decoding units to be equal again at the time of allocating the next series of segments, the image decoding device of the present invention corrects the imbalance in processing times between the image decoding units, occurring due to skipping the segment (video signal) being decoded, thus enabling improving processing efficiency.

Here, the image decoding device may further include an extraction unit operable to extract data amounts and feature information of the segments from the first video signal, wherein the allocation control unit allocates the one or more segments to the image decoding units, with use of the data amounts and feature information of the segments extracted by the extraction unit, so that the processing times of the image decoding units are substantially equal.

To use MPEG-2 as a specific example, note that the feature information is picture type, motion compensation information (intra-frame prediction, forward prediction, backward prediction, bi-directional prediction), etc.

In general, since the larger the data amount, the higher the processing load, an image processor with a higher processing ability is necessary to perform image processing on large data amounts. Also, since the larger the data amount, the higher the data bandwidth necessary for transferring a bit stream to image decoding units, an image processor with a higher data bandwidth is necessary to perform image processing on large data amounts.

Regarding the motion compensation information, although a segment on which decoding processing is performed by intra-frame prediction does not require a predictive reference image for decoding processing, a segment on which decoding processing is performed by unidirectional prediction (forward prediction or backward prediction) requires predictive reference images equal to the amount of segments in the decoding processing. Also, segments on which decoding processing is performed by bi-directional prediction require twice the amount of predictive reference images as the amount of segments in the segment decoding processing. In view of this, it is preferable for segments that require a greater amount of predictive reference images for image processing, in the order of bi-directional prediction, unidirectional prediction, and intra-frame prediction, to be allocated in that order to image decoding units having higher bandwidth.

The image decoding device of the present invention enables improving processing efficiency by allocating segments in consideration of the data amounts and the feature information of the segments, so that the processing times of the respective image decoding units are equal.

Here, in the image decoding device, the allocation control unit, for each of the image decoding units, may generate a second video signal composed of (i) allocation information in which is written an allocation of segments to the plurality of image decoding units, and (ii) one or more segments allocated to the decoding units, and output the generated second video signal to the image decoding units.

Also, the image decoding device may further include a plurality of buffering units corresponding to the image decoding units, operable to store the second video signals, that the image decoding units received from the allocation control unit, and a decoding result decoded by the image decoding units, wherein the image decoding units may extract the allocation information from the second video signal, and the image decoding units, according to the extracted allocation information, acquire a necessary decoding result from the plurality of buffering units, and perform (a) decoding processing by the image decoding units, (b) error concealment processing when an error is detected by the error detection unit, and (c) display processing to output an image.

According to this structure, the image decoding device of the present invention supplies a second video signal, to which allocation information has been added, to the image decoding units. This enables the image decoding units to identify positions of images required for decoding processing, error concealment processing, and display processing, by using the allocation information.

When providing an image decoding device that performs a new and effective allocation control as in the present invention, the image decoding device can be realized without greatly changing the structure of an existing system.

Here, in the image decoding device, the error detection unit may set a header portion of each segment as an error detection target, and detect an error that causes inability to continue decoding the header portion, and the error detection units included in the image decoding units may set texture data of each segment as an error detection target, and detect an error that causes inability to continue decoding the texture data.

According to this structure, since the processing load before the decoding processing can be made smaller than the processing load in the image decoding units, the image decoding device of the present invention enables performing decoding processing without losing real-time quality in the image decoding units.

Here, the image decoding device may further include an extraction unit operable to extract a data amount of the first video signal; an acquisition unit operable to acquire capability information pieces each indicating a respective processing ability of one of the plurality of image decoding units, and a selection unit operable to select one or more image decoding units to be used in decoding processing of the first video signal, in accordance with the acquired plurality of capability information pieces, and the data amount of the first video signal, wherein the image decoding units may further include a capability information storage unit for storing the capability information pieces.

According to this structure, the image decoding device selects an image decoding unit necessary for decoding the first video signal, and allocates processing to the image decoding units. Therefore, the image decoding device enables improving processing ability by newly adding an image decoding unit to a system that has been configured once.

Note that the plurality of image decoding units correspond to the image decoding units 106a to 106n shown in FIGS. 1, 11, and 13, the storage unit corresponds to the segment allocation history/error detection position history management unit 105, the allocation control unit corresponds to the segment allocation determination unit 102, and the error detection unit corresponds to the first error detection unit 104.

Also, the extraction unit corresponds to the data amount/feature information detection unit 101 shown in FIGS. 1, 11, and 13.

Also, the plurality of buffering units correspond to the image decoding result buffering units 111a to 111n shown in FIGS. 1, 11, and 13.

Also, the acquisition unit corresponds to the capability information collection unit 114 shown in FIGS. 11 and 13, the selection unit corresponds to the segment allocation determination unit 102 shown in FIGS. 11 and 13, and the capability information storage unit corresponds to the capability information storage units 115a to 115d shown in FIG. 11.

BRIEF DESCRIPTION OF THE DRAWINGS

FIGS. 5A, 5B, and 5C show an exemplary management table stored in a segment allocation history/error detection position history management unit 105;

FIGS. 8A and 8B show exemplary segment division allocation when an error is detected;

DESCRIPTION OF THE CHARACTERS

Figure 1:
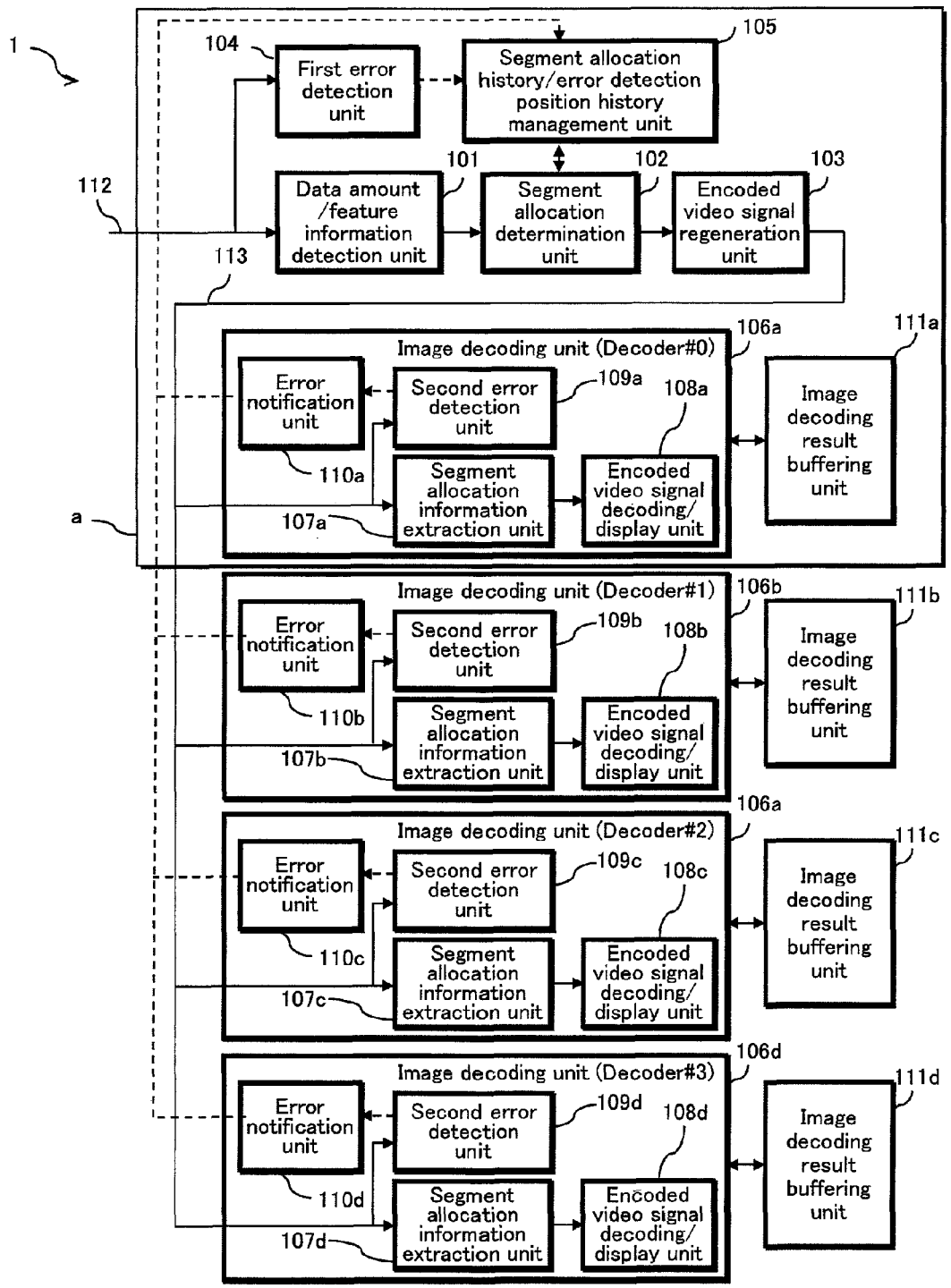
FIG. 1 is a block diagram showing a structure of an image decoding device 1 of embodiment 1 of the present invention.

1 Image decoding device
2 Image decoding device
3 Image decoding system
101 Data amount/feature information detection unit
102 Segment allocation determination unit
103 Encoded video signal regeneration unit
104 First error detection unit
105 Segment allocation history/error detection position history management unit
106a-106n Image decoding units
107a-107d Segment allocation information extraction units
108a-108d Encoded video signal decoding/display units
109a-109d Second error detection units
110a-110d Error notification units
111a-111d Image decoding result buffering units
115a-115d Capability information storage units
112 First bit stream
113 Second bit stream
114 Capability information collection unit
1201 Image encoding device
1202 Image decoding device
1203 Transmission path
1204 Preprocessing unit
1205 Image decoding unit
1206a-1206n Substrates
1207 External connection bus
1208 Error position notification signal
1209a-1209n Socket
1210 Image decoding bus

DETAILED DESCRIPTION OF THE INVENTION

Here, embodiments of the present invention are described below with reference to the drawings. In the embodiments of the present invention, a case is described, as an example, of performing decoding processing, with use of four image decoding units operating in parallel, on a video signal that has been encoded according to the MPEG-2 standard. However, this is only an example, and the present invention is not limited to including four image decoding units operating in parallel, and the encoded video signal is not limited to being encoded according to the MPEG-2 standard.

Embodiment 1

Here, the following describes an image decoding device 1 pertaining to embodiment 1 of the present invention.

Structure

FIG. 1 is a functional block diagram showing the structure of the image decoding device 1.

As shown in FIG. 1, the image decoding device 1 includes a data amount/feature information detection unit 101, a segment allocation determination unit 102, an encoded video signal regeneration unit 103, a first error detection unit 104, a segment allocation history/error detection position history management unit 105, image decoding units 106a to 106d, and image decoding result buffering units 111a to 111d.

The image decoding device 1 is specifically implemented by a computer system including a microprocessor, a ROM, a RAM, etc. Also, the image decoding device 1 is not limited to this, and may be realized as an ASSP (Application Specific Standard Product).

(1) Data Amount/Feature Information Detection Unit 101

The data amount/feature information detection unit 101 receives a first digitally encoded video signal (hereinafter referred to as a "first bit stream") 112, and extracts a data amount and feature information for each segment of the first bit stream 112.

Figure 2:
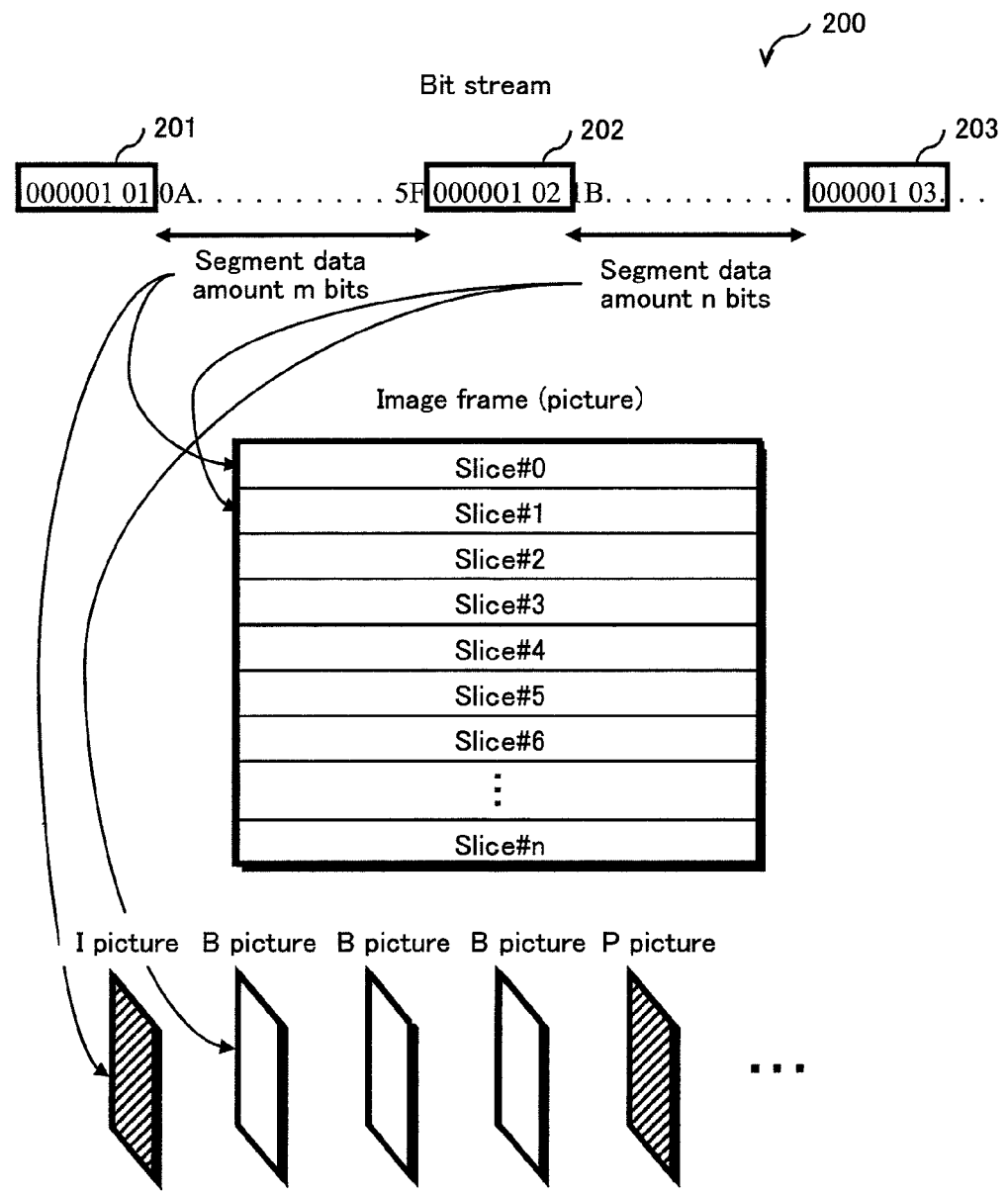
FIG. 2 shows an exemplary division of segments of a digitally decoded video signal, and amounts of data in each segment.

FIG. 2 illustrates segments of a bit stream 200 encoded according to the MPEG-2 standard.

In the MPEG-2 standard, as shown in FIG. 2, the bit stream 200 is segmented according to start codes composed of 32 bits which are composed of a value 000001 (23 zeros followed by 1) in hexadecimal and 8 bits of data that follow the value. The bit stream 200 shown in FIG. 2 includes start codes 201, 202, and 203. Also, as shown in FIG. 2, in the MPEG-2 standard, it is possible to set either a picture or a slice as a unit for a segment that can be identified by detecting a start code.

First, the data amount/feature information detection unit 101 detects the start code 201 in the bit stream 200. Thereafter, the data amount/feature information detection unit 101 decodes, from among the m bits of data following the start code 201, a portion of the bit stream that is necessary as feature information, and reads the information. The data amount/feature information detection unit 101 skips decoding the bit stream following the portion of the bit stream that is necessary for feature information, and detects the next start code 202. The data amount/feature information detection unit 101 repeats the operation until all of the start codes are detected.

Here, the feature information is picture type, motion compensation information (intra-frame prediction, forward prediction, backward prediction, bi-directional prediction), etc.

Also, the data amount/feature information detection unit 101 detects the data amount of each segment. The data amount of each segment is an amount of bits from one start code to a next start code. For example, in FIG. 2, the data amount of the segment starting with the start code 201 is m bits, and the data amount of the segment starting with the start code 202 is n bits. The data amount/feature information detection unit 101 registers the detected data amount in the segment allocation history/error detection position history management unit 105 via the segment allocation determination unit 102.

Note that the data amount/feature information detection unit 101 includes a variable length decoding unit, which performs decoding and reading of the portion of the bit stream.

(2) Segment Allocation Determination Unit 102

The segment allocation determination unit 102 determines, based on data amounts of the slices and the respective capability information of the image decoding units 106a to 106d, for each of the image decoding units 106a to 106d, an allocation of one or more slices on which the image decoding unit is to perform processing, thus generating an allocation result. The segment allocation determination unit 102 notifies the determined allocation result to the segment allocation history/error detection position history management unit 105. Here, in the present embodiment, the respective capability information of the image decoding units 106a to 106d is stored in advance in the segment allocation determination unit 102.

The segment allocation determination unit 102 determines division allocations for every plurality of segments until all the image decoding processing is finished. That is to say, while each of the image decoding units 106a to 106d is performing decoding processing on the one or more slices that have been allocated thereto, the segment allocation determination unit 102 determines division allocations of a next series of segments. For this reason, the segment allocation determination unit 102 includes a buffering unit that accumulates the plurality of segments worth of the first bit stream.

The segment allocation determination unit 102 judges a timing of allocation for a next series of segments for the image decoding units 106a to 106d based on a buffer amount of the first bit stream 112 being buffered, or processing circumstances of the image decoding units 106a to 106d. At this time, the segment allocation determination unit 102 determines an allocation of a next series of segments for the image decoding units 106a to 106d with use of the data amounts of the slices and the capability information of the image decoding units 106a to 106d, and information managed by the segment allocation history/error detection position history management unit 105.

Note that in the present embodiment, the data amount/feature information detection unit 101 may be constituted to divide the first bit stream into slices, and store each slice in the buffering unit of the segment allocation determination unit 102, or the segment allocation determination unit 102 may be configured to read the first bit stream stored in the buffering unit, thereafter dividing the first bit stream into one or more slices, and allocating the slices to the image decoding units 106a to 106d.

Hereinafter, in the present embodiment, the one or more slices allocated by the segment allocation determination unit 102, for the image decoding unit to perform processing on, are referred to as "segments".

The processing performed by the segment allocation determination unit 102 is described in detail later.

(3) Encoded Video Signal Regeneration Unit 103

The encoded video signal regeneration unit 103 adds segment allocation information to segments allocated to the image decoding units by the segment allocation unit 102, thus generating a second digitally encoded video signal (hereinafter referred to as a "second bit stream") 113 for inputting to the image decoding units.

Note that in the present embodiment, for convenience, the second bit streams 113 input to the image decoding units 106a, 106b, 106c, and 106d are referred to respectively as the second bit streams 113a, 113b, 113c, and 113d.

Figure 3:
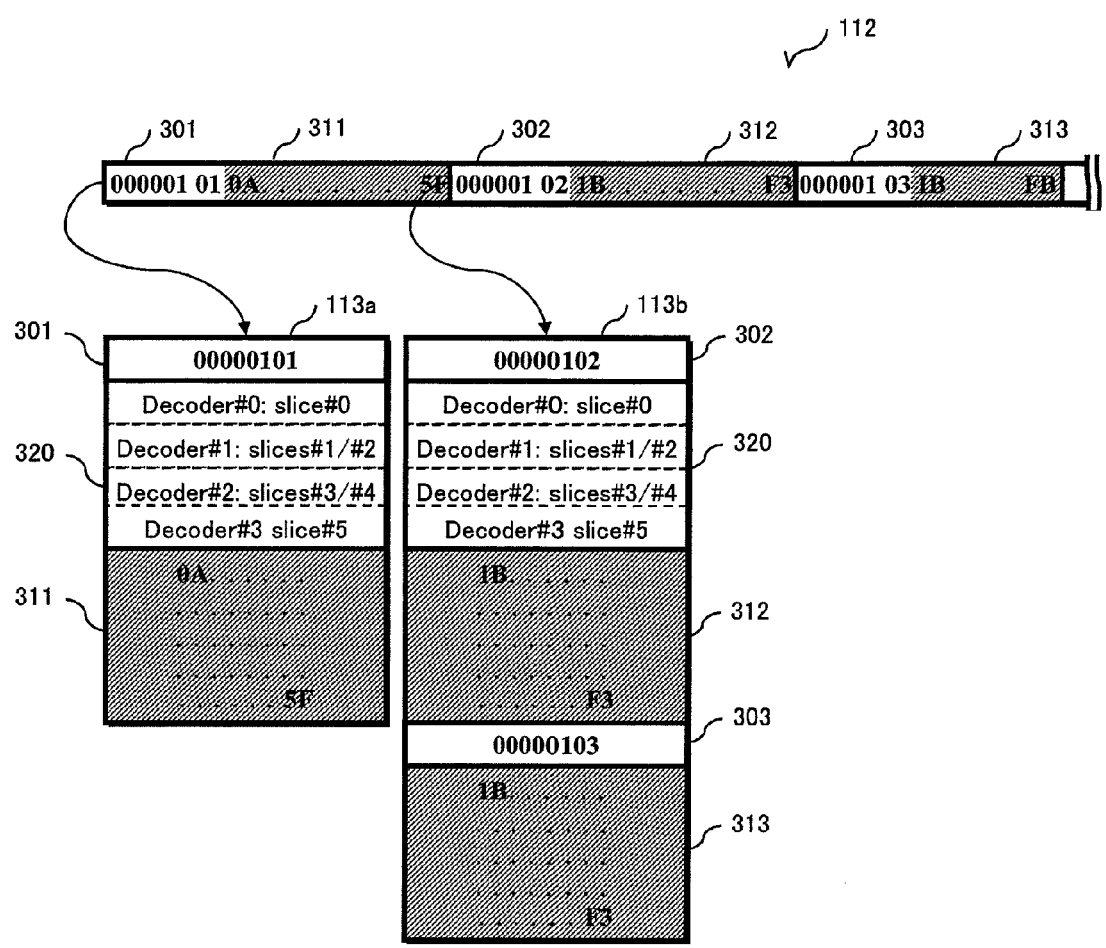
FIG. 3 shows an exemplary first bit stream and second bit stream.

FIG. 3 illustrates a relationship between the first bit stream 112 and the second bit stream 113.

As described with reference to FIG. 2, the bit stream encoded according to the MPEG-2 standard is segmented according to start code.

As shown in FIG. 3, the first bit stream 112 includes a start code 301, a bit stream 311 that follows the start code 301, a start code 302, a bit stream 312 that follows the start code 302, a start code 303, a bit stream 313 that follows the start code 303 . . . and so on.

The second bit streams 113a and 113b shown in FIG. 3 are given as a specific example of allocating a slice#0 to a Decoder#0 (the image decoding unit 106a) as one segment, a slice#1 and a slice#2 to a Decoder#1 (the image decoding unit 106b) as one segment, a slice #3 and a slice#4 to a Decoder#2 (the image decoding unit 106c) as one segment, and the slice#3 to the Decoder#3 (the image decoding unit 106d) as one segment.

The second bit stream 113a includes a start code 301, segment allocation information 320, and a bit stream 311.

The second bit stream 113b includes the start code 302, the segment allocation information 320, and the bit stream 313.

Since the start codes express start points for decoding processing, start codes are added as follows. The encoded video signal regeneration unit 130 adds the start code 301 of the first bit stream 112 directly to the second bit stream 113a, and adds the start code 302 of the first bit stream directly to the second bit stream 113b.

The encoded video signal regeneration unit 103 adds identical segment allocation information 320 to each of the second bit streams 113a to 113d. The segment allocation information 320 is arranged, with use of a user data layer defined in the MPEG-2 standard, following the start code. The segment allocation information 320 is information indicating which slice, of slice#0 to slice#5, is allocated to which decoder, of Decoder#0 to Decoder#3. Note that the segment allocation information is updated whenever the allocation processing is performed by the segment allocation determination unit 102.

The encoded video signal regeneration unit 103 adds a bit stream following each start code in the first bit stream to a portion following the segment allocation information 320, thus generating the second bit stream.

When a plurality of slices are allocated to one image decoding unit as one segment, as shown in the second bit stream 113b of FIG. 3, the segment allocation information 320 is arranged following immediately after the first start code 302, and the segment allocation information 320 need not be arranged following immediately after the next start code 303.

(4) First Error Detection Unit 104

The first error detection unit 104 performs decoding and reading on the first bit stream, and checks for an error that causes inability to continue decoding. Upon detecting an error that causes inability to continue decoding, the first error detection unit 104 notifies the error detection position to the segment allocation history/error detection position history management unit 105 as error detection history information.

In the present embodiment, the error detected by the first error detection unit 104 is referred to as a "first error". In contrast, an error detected by one of the second error detection units 109a to 109d is referred to as a "second error".

Figure 4:
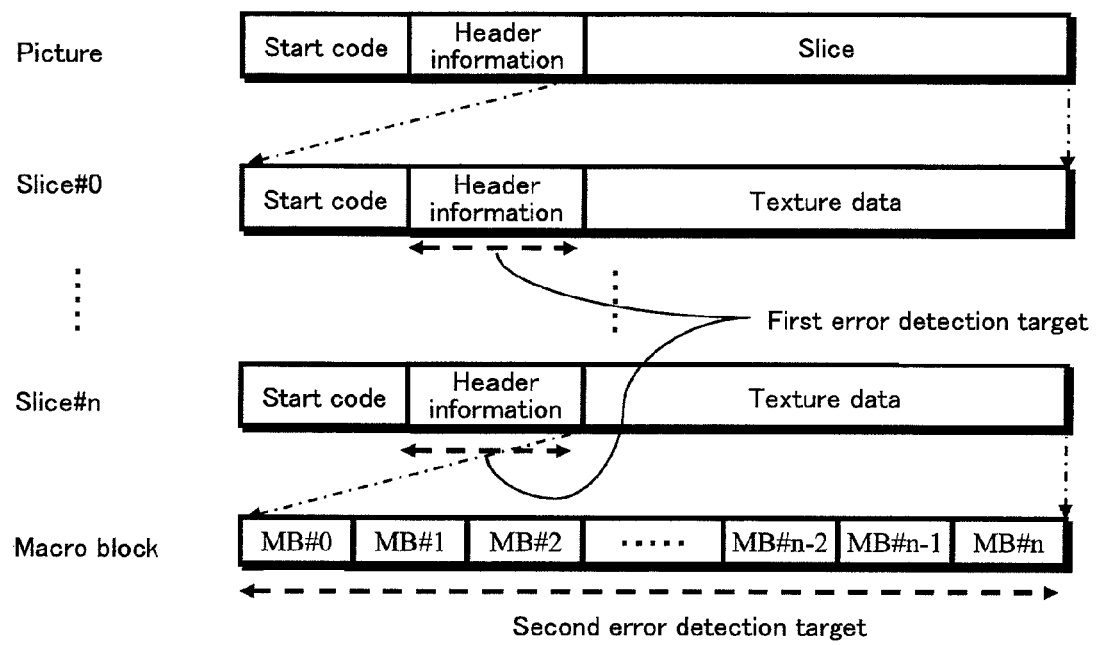
FIG. 4 shows exemplary error detection target positions of a first error detection unit 104 and exemplary error detection target positions of second error detection units 109a to 109d.

FIG. 4 illustrates the first error and the second error.

As shown in FIG. 4, the information that is targeted for error detection by the first error detection unit 104 is header information of the slices. The information that is targeted for error detection by the second error detection units 109a to 109d is macroblock data.

(5) Segment Allocation History/Error Detection Position History Management Unit 105

The segment allocation history/error detection position history management unit 105 stores and manages data amounts detected by the data amount/feature information detection unit 101, an allocation result determined by the segment allocation determination unit 102, an error detection position for the error detected by the first error detection unit 104, and an error detection position for the error detected by the later-described second error detection units 109a to 109d.

Specifically, the segment allocation history/error detection position management unit 105 manages the types of information described above with use of the management table 500 shown in FIG. 5C.

Here, first, the following briefly describes, with use of FIGS. 5A and 5B, the structures of pictures and slices in the MPEG-2 standard.

FIG. 5A shows image frames (pictures) that make up the first bit stream 112. Decode frame numbers indicate an order of decoding. Also, in the example of FIG. 5A, an I picture whose decode frame number is "#0", a P picture whose decode frame number is "#1", and a P picture whose decode frame numbers is "#5" correspond to reference images. Also, the pictures, as shown in FIG. 5B, are constituted from n+1 slices whose slice numbers are from #0 to #n.

The segment allocation history/error detection position history management unit 105 stores the management table 500 shown in FIG. 3C.

As shown in FIG. 3C, the management table 500, for each slice constituting each frame, correlates a slice number, a data amount, an allocation result, a first error detection position, and a second error detection position.

The data amount is a data amount for each slice detected by the data amount/feature information detection unit 101.

The allocation result is information, determined by the segment allocation determination unit 102, for identifying which image decoding unit (Decoder#0 to #3) is to perform decoding processing on each slice.

The first error detection position is flag information indicating whether a first error has been detected in the decoding of the first bit stream corresponding to the respective slice number. "0" indicates that the first error has not been detected, and "1" indicates that the first error has been detected.

The second error detection position indicates a bit position in which the second error was detected in the decoding of the second bit stream corresponding to the respective slice number. Specifically, the second error detection position is a data amount of the second bit stream decoded by the encoded video signal decoding/display units 108a to 108d until the time that an error that causes inability to continue decoding is detected. The management table 500 shown in FIG. 5C indicates that the first error and the second error have not been detected yet.

When the allocation is determined by the segment allocation determination unit 102, the segment allocation history/error detection position history management unit 105 registers and stores the allocation result in the management table. Here, the segment allocation history/error detection position history management unit 105 need only register and store several image frames worth of information to be reference images in the motion compensation processing of the image decoding processing.

(6) Image Decoding Units 106a to 106d

The image decoding units 106a to 106d are decoders that perform processing in parallel on the second bit stream 113.

The image decoding units 106a to 106d temporarily store, respectively, the second bit streams 113a to 113d in the image decoding result buffering units 111a to 111d, and while reading the second bit streams 113a to 113d from the image decoding result buffering units 111a to 111d, performs decoding processing on the second bit streams 113a to 113d. The image decoding units 106a to 106d write the decoding results of the second bit streams 113a to 113d to the image decoding result buffering units 111a to 111d, respectively.

Note that it is not necessary for the image decoding device 1 of the present embodiment to be constituted from image decoding units that all have identical processing ability. The image decoding units 106a to 106d each have a specific amount of processing ability, and the details of the processing abilities of the image decoding units are described later.

As shown in FIG. 1, the image decoding units 106a to 106d are constituted from the segment allocation information extraction units 107a to 107d, the encoded video signal decoding/display units 108a to 108d, the second error detection units 109a to 109d, and the error notification units 110a to 110d.

The segment allocation information extraction units 107a to 107d receive the second bit streams 113a to 113d respectively, and detect start codes in the received second bit streams 113a to 113d. The segment allocation information extraction units 107a to 107d extract the segment allocation information that follows each start code, and store the extracted segment allocation information in the segment allocation information extraction units 107a to 107d.

Here, the segment allocation information included in the second bit stream is updated each time the allocation is determined by the segment allocation determination unit 102. Accordingly, the segment allocation information stored in the segment allocation information extraction units 107a to 107d is also updated each time the allocation is determined by the segment allocation determination unit 102.

The second error detection units 109a to 109d detect errors that cause inability to continue decoding in the second bit streams 113a to 113d, respectively.

The error notification units 110a to 110d notify the error detection positions of errors detected by the second error detection units 109a to 109d, respectively, to the segment allocation history/error detection position history management unit 105.

The encoded video signal decoding/display units 108a to 108d, with use of the segment allocation information extracted by the segment allocation information extraction units 107a to 107d, respectively, decodes and displays the second bit streams 113a to 113d.

In the MPEG-2 standard, since the P pictures and the B pictures have been encoded by intra-frame predictive coding, pictures that have been decoded before the decoding of the pictures currently targeted for decoding are necessary as the predictive reference images. In view of this, for acquiring the predictive reference images, the encoded video signal decoding/display units 108a to 108d use the segment allocation information extracted by the segment allocation information extraction units 107a to 107d.

In the present embodiment, the image decoding units 106a to 106d store the decoding results of the second bit streams in the respective image decoding result buffering units 111a to 111d.

The segment allocation information indicates which of the image decoding units 106a to 106d has performed processing on which segment. Accordingly, the segment allocation information indicates which one of the image decoding result buffering units 111a to 111d stores therein the decoding results of which of the positions in the picture, and also indicates which one of the image decoding result buffering units 111a to 111d stores therein the decoding results for each slice included in each picture in the image sequence.

For example, when the encoded video signal decoding/display unit 108d refers, as a predictive reference image, to a decoding result stored in the image decoding result buffering unit 111b on which processing has been performed by the encoded video signal decoding/display unit 108b, the encoded video signal decoding/display unit 108d transmits a request for acquiring a predictive reference image to the image decoding unit 108b, and the encoded video signal decoding/display unit 108b reads, from the decoding result storage buffering unit 111b, an appropriate predictive reference image, and transfers the read predictive reference image to the image decoding unit 106d.

The encoded video signal decoding/display unit 108d stores the received predictive reference image in the image decoding result buffering unit 111d. The encoded video signal decoding/display unit 108d, when a predictive reference image is necessary for the decoding processing, reads the predictive reference image from the image decoding result buffering unit 111d, and performs decoding processing.

The same is true when the encoded video signal decoding/display unit 108d references, as predictive reference images, decoding results stored in the other image decoding result buffering units 111a to 111d, which are the results of decoding processing performed by the other encoded video signal encoding/display units 108a to 108c.

Also, the encoded video signal encoding/display units 108a to 108d are required to read, from the image decoding result buffering units 111a to 111d, decoding results to be displayed in a raster order of image frames in the image display processing. At this time also, similarly to the case described above of acquiring the predictive reference images, the encoded video signal decoding/display units 108a to 108d, with use of the segment allocation information, reads the image decoding results displayed from the image decoding result buffering units 111a to 111d. The encoded video signal decoding/display units 108a to 108d output the image decoding results to a display unit not depicted in FIG. 1.

(7) Image Decoding Result Buffering Units 111a to 111d

The image decoding result buffering units 111a to 111d store, respectively, the second bit streams 113a to 113d decoded by the image decoding units 106a to 106d, and the image decoding results decoded by the image decoding units 106a to 106d.

This completes the description of the internal structure of the image decoding device 1.

The following describes the details of the segment allocation processing.

Segment Allocation Processing Before Error Detection

First, in the respective units of the first error detection unit 104 and the second error detection units 109a to 109d, the following describes segment allocation processing in a case that an error has not been detected.

In general, since the larger the data amount, the higher the processing load, an image decoding unit with a higher processing ability is necessary to perform decoding processing on large data amounts. Also, since the larger the data amount, the higher the data bandwidth necessary for transferring a bit stream to image decoding units, an image decoding unit with a higher data bandwidth is necessary to perform decoding processing on large data amounts.

Also, regarding the motion compensation information, a segment on which decoding processing is performed by intra-frame prediction does not require a predictive reference image for the decoding processing. However, a segment on which decoding processing is performed by unidirectional prediction (forward prediction or backward prediction) requires a corresponding amount of predictive reference images according to the number of segments in the decoding processing. Also, for segments on which bi-directional decoding processing is performed, a corresponding amount of predictive reference images twice the number of segments in the decoding processing is required for the segment.

In general, it is preferable for the decoding processing to be performed by an image decoding unit having a higher data bandwidth the larger the predictive reference image. In view of this, the segment allocation determination unit 102, in accordance with the motion compensation information of the segment, allocates segments requiring larger numbers of predictive reference images for decoding processing, in descending order of bi-directional prediction, unidirectional prediction, intra-frame prediction, to the image decoding units with the higher data bandwidths, in rough proportion.

In consideration of this, the segment allocation determination unit 102 allocates segments to the image decoding units so that the processing time of the segments processed by the image decoding units is short, and the processing times in the image decoding units are equal.

First, the segment allocation determination unit 102 calculates, based on a frame size and frame rate of the first bit stream, and the frame size and frame rate of the corresponding images of the image decoding units, a macroblock number l at which the image decoding units are capable of performing image decoding processing in one second.

Here, the macroblock number l that is the number of macroblocks on which decoding processing can be performed in one second is "l=s/16×t/16×u", where the horizontal size of the image frame size is s, the vertical size is t, and the frame rate is u.

Accordingly, the number of macroblocks that can be decoded in one second by the image decoding units in the present embodiment is Pi (i being a number between 1 and N of image decoding units that perform parallel processing. In the present embodiment, n=4). Where the horizontal size of the corresponding image frame size of the image decoding units is si, the vertical size of the image decoding units is ti, and the corresponding frame rate of the image decoding units is ui, $$Pi = si/16 \times ti/16 \times ui.$$

Note that to perform processing to decode a single bit stream that exceeds the processing ability of a single image decoding unit, the number of image decoding units must be reserved so that 1/Q<1, where Q is a summation of si/16×ti/16×ui, which is the processing abilities of each of the image decoding units.

Upon receiving a data amount for each of the detected slices from the data amount/feature information detection unit 101, the segment allocation determination unit 102 registers the received data amount in the segment allocation history/error detection position history management unit 105. The segment allocation determination unit 102 acquires data amounts of the slices from the segment allocation history/error detection position history management unit 105, performs segment allocation processing, and registers the result in the segment allocation/error detection position history management unit 105.

Also, the present invention is not limited to this structure, and the segment allocation determination unit 102 may be configured to perform segment allocation processing with use of data amounts received from the data amount/feature information detection unit 101, and register the result in the segment allocation history/error detection position history management unit 105.

Figure 6A:
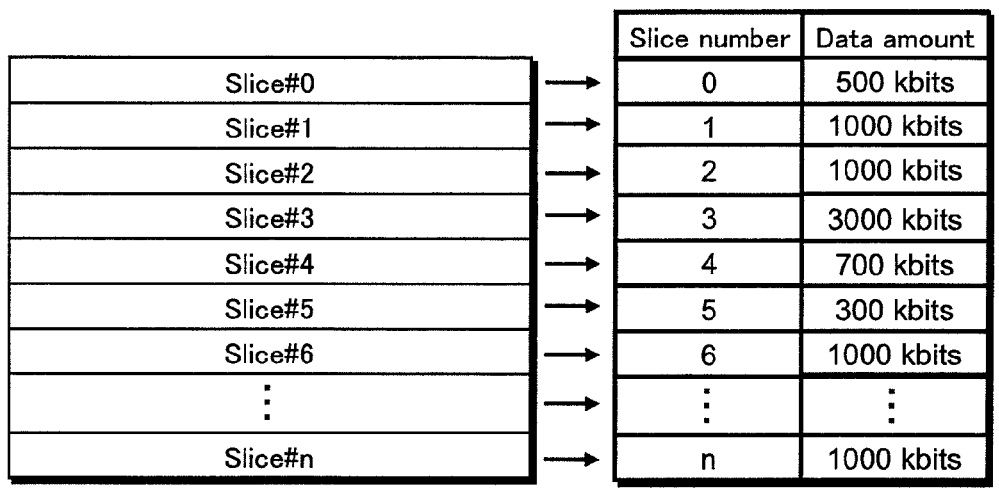
FIGS. 6A, 6B, and 6C show exemplary amounts of data in segments, capability information, and allocation of segment divisions when an error is not detected.

FIG. 6A shows an example of the data amounts, detected by the data/feature information detection unit 101, for each of the slices.

As shown in FIG. 6A, the data amount of slice#0 is 500 kbits, the data amount of slice#1 is 1000 kbits, the data amount of slice#2 is 1000 kbits, the data amount of slice#3 is 3000 kbits, the data amount of slice#4 is 700 kbits, the data amount of slice#5 is 300 kbits, the data amount of slice#6 is 1000 kbits, . . . , and the data amount of slice#n is 1000 kbits.

Also, as described previously, the segment allocation determination unit 102 stores the capability information of the image decoding units 106a to 106d in advance.

Figure 6B:
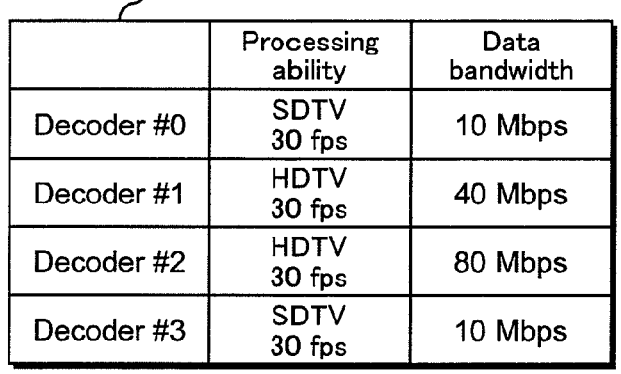

FIG. 6B shows an example of capability information stored in advance in the segment allocation determination unit 102. Capability information 600 shown in FIG. 6B correlates the processing abilities and the input data bandwidths of the image decoding units.

As shown in FIG. 6B, the image decoding unit 106a (Decoder#0) has a processing ability for SDTV (Standard Definition TV) image size and 30 fps (frames per second) frame rate, and has an input data bandwidth of 10 Mbps (Megabits per second).

The image decoding unit 106b (Decoder#1) has a processing ability for HDTV (High Definition TV) image size and 30 fps frame rate, and has an input data bandwidth of 40 Mbps.

The image decoding unit 106c (Decoder#2) has a processing ability for HDTV image size and 30 fps frame rate, and has an input data bandwidth of 80 Mbps.

The image decoding unit 106d (Decoder#3) has a processing ability for an SDTV image size and 30 fps frame rate, and an input data bandwidth of 10 Mbps.

Note that the SDTV image size is 720 pixels per line, with 480 lines per frame, and the HDTV image size is 1920 pixels per line, and 1080 lines per image frame.

According to the above information, where "mi" is the segment data amount of a divided segment ("i" is the number of divided segments, and corresponds to the number, from 1 to n, of image decoding units that perform processing in parallel), the segment allocation determination unit 102 allocates segments to each of the image decoding units so as to make the values of m0/P0, m1/P1, . . . , mi/Pi as equal as possible.

Here, as a method of allocation so that the values m0/P0, m1/P1, . . . , mi/Pi areas equal as possible, for example, a similar method to the scheduling processing used in the multiprocessor described in "Seongbeom Kim, Dhruba Chandra and Yan Solihin. Cache Sharing and Partitioning in a Chip Multiprocessor Architecture. In the Proceedings of the International Conference on Parallel Architectures and Compilation Techniques (PACT), 2004", which is known technology, may be used.

Figure 6C:
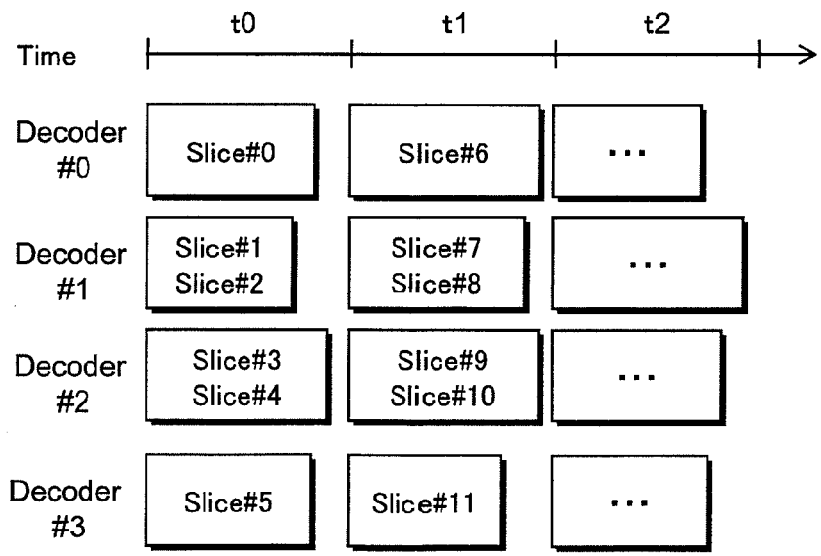

FIG. 6C is a pattern diagram showing results of the above-described allocation processing performed by the segment allocation determination unit 102 based on the capability information 600 and the data amount in slice units. The times t0, t1, t2, . . . , express processing times in segment units.

As shown in FIG. 6C, to make the processing periods t0 of the Decoder#0 to Decoder#3 as equal as possible, the segment allocation determination unit 102 allocates the slice#0 to the Decoder#0 as one segment, allocates the slice#1 and slice#2 to the Decoder#1 as one segment, allocates the slice#3 and the slice#4 to the Decoder#2 as one segment, and allocates the slice#5 to the Decoder#3 as one segment.

By repeating the above-described allocation processing, for the processing periods t1, t2, . . . , segments are allocated to the image decoding units so that the processing periods t1, t2, . . . of Decoder#0 to Decoder#3 are as equal as possible.

Note that "allocating one or more segments to each of the image decoding units so that the processing times of processing by the image decoding units are substantially equal" in the claims means, as described above, one or more slices are allocated to each of the image decoding units so that the values of m0/P0, m1/P1, . . . , mi/Pi, in the respective periods of the processing times t0, t1, t2, . . . , are as equal as possible.

In the present embodiment, decoding processing in real time is enabled by performing high-speed processing of segments that make up a picture, and finishing processing for all segments that make up the picture in the time span of one frame.

Note that although in the present embodiment, a processing ability Pi of the image decoding units is calculated with use of a number of macroblocks that can be decoded in the span of one second, the processing ability Pi of the present invention is not limited to this.

Segment Allocation Processing After Error Detection

Here, segment allocation processing when an error is detected is described.

In general, when an error is detected midway through the decoding processing performed by the image decoding unit, another decoded image is substituted for the segment that could not be decoded due to the error.

Also, in the present embodiment, if a second error is detected by the image detecting units 106a to 106d, error concealment processing is performed to substitute another decoded image.

Figure 7A:
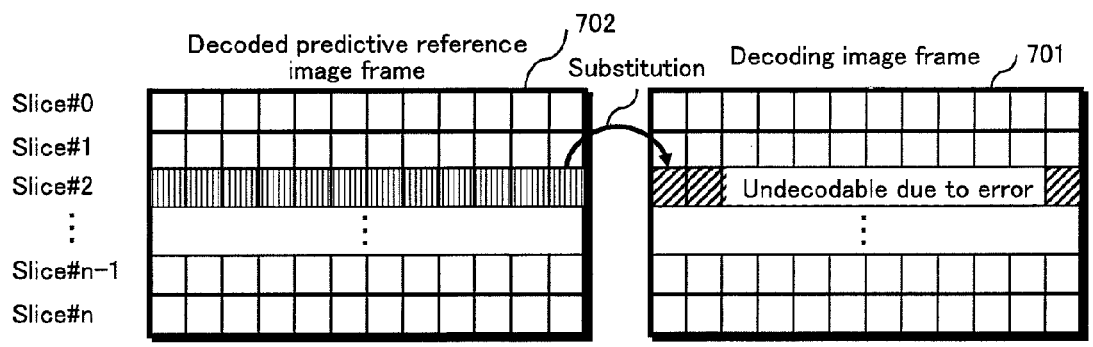
FIGS. 7A, 7B, and 7C show exemplary error concealment processing and movement of a predictive reference image that is to be a substitute image at the time of error concealment processing.

FIG. 7A illustrates error concealment processing of the present embodiment. A decoding image frame 701 is a frame currently targeted for decoding. In the decoding processing performed on the decoding image frame 701, for example, if an error is detected in the slice#2, an image in a same position as a decoded predictive reference image frame 702 that is closest temporally (the image of slice#2) is used as a substitute image.

Figure 7B:
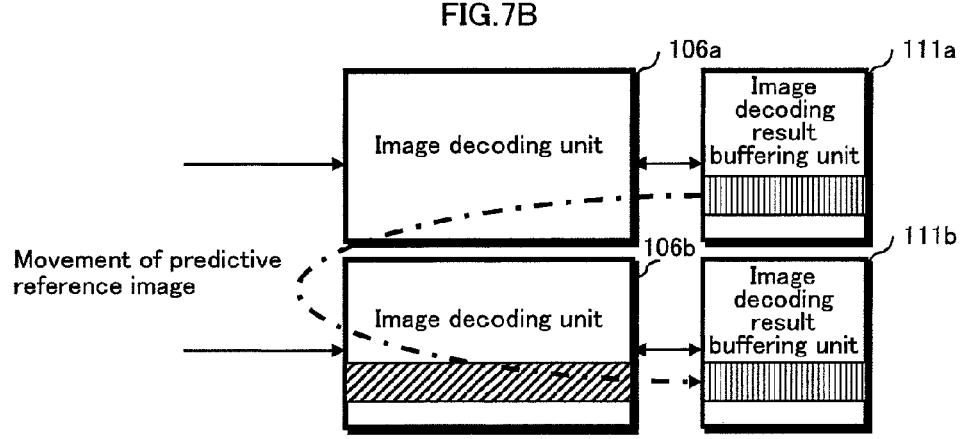

FIG. 7B shows movement of a predictive reference image in a case that a slice#2 of a decoded predictive reference image frame 702, targeted to be a substitute image, and a slice#2 of the decoding image frame 701, are allocated to different image decoding units. In FIG. 7B, an example is shown in which the slice#2 of the decoded reference image frame 702 is allocated to the image decoding unit 106a, and the slice#2 of the decoding image frame 701 is allocated to the image decoding unit 106b.

In the present embodiment, the image decoding units 106a to 106d only store decoding results in the respective corresponding image decoding result buffering units 111a to 111d. For this reason, when an error is detected by the image decoding unit 106b, it is necessary for the image decoding unit 106a to transfer a decoding result (substitute image) stored in the image decoding result buffering unit 111a to the image decoding unit 106b.

It is possible that this error concealment processing (processing to transfer the substitute image) may influence the decoding processing of the image decoding units 106a and 106b, and delay the decoding processing times of the image decoding units 106a and 106b. Since the image decoding units 106a to 106d perform decoding processing in parallel, there may be a delay of decoding processing time by one of the image decoding units that influences the overall decoding processing time of the image decoding device 1. In view of this, in the present embodiment, a measure is taken so that the decoding processing times among the image decoding units does not become unequal, by performing error concealment processing.

(1) Processing when the First Error is Detected

Immediately after the start of decoding processing performed on the first bit stream, the segment allocation history/error detection history management unit 105 does not store information indicating the allocation of segments for the image decoding units 106a to 106d. That is to say, the "allocation results" field in the management table 500 shown in FIG. 5C is blank. In view of this, immediately after the start of the decoding processing, as described above, the segment allocation determination unit 102 performs the allocation in accordance with the data amounts of the slices and the capability information of the image decoding units 106a to 106d.

The processing for decoding the first bit stream progresses, and when the first error is detected after the decoding processing has been finished for the image that is to be the predictive reference image, the segment allocation determination unit 102 preferentially allocates the segment in which the first error was detected to the same image decoding unit as the image decoding unit that performed the image decoding processing of the decoded image that is to be the predictive reference image. Thereafter, the segment allocation determination unit 102 performs segment allocation processing in accordance with the data amounts of the slices and the capability information of the image decoding units 106a to 106d so that the decoding processing times of processing by each of the image decoding units 106a to 106d are equal.

FIG. 8A shows a management table 800, in a case that the first error has not been detected, that is managed by the segment allocation history/error detection history management unit 105.

Meanwhile, FIG. 8B shows a management table 810, in a case that the first error has been detected, managed by the segment allocation history/error detection history management unit 105. The fact that, according to FIG. 8B, a first error detection position flag corresponding to the slice number#2 of the decode frame number#1 is "1" illustrates that the first error was detected at the slice number#2 of the decode frame number#1. Note that the predictive reference image of the decode frame number#1 is an image of the decode frame number#0.

When the first error is not detected, the segment allocation determination unit 102 allocates the slice number#2 of the decode frame number#1 to the Decoder#2 (see FIG. 8A). However, if the first error is detected, since the slice number#2 of the decode frame#0 to be the substitute image is allocated to the Decoder#1, the segment allocation determination unit 102 allocates the slice number#2 of the decode frame number#1 to the same Decoder#1.

Figure 7C:
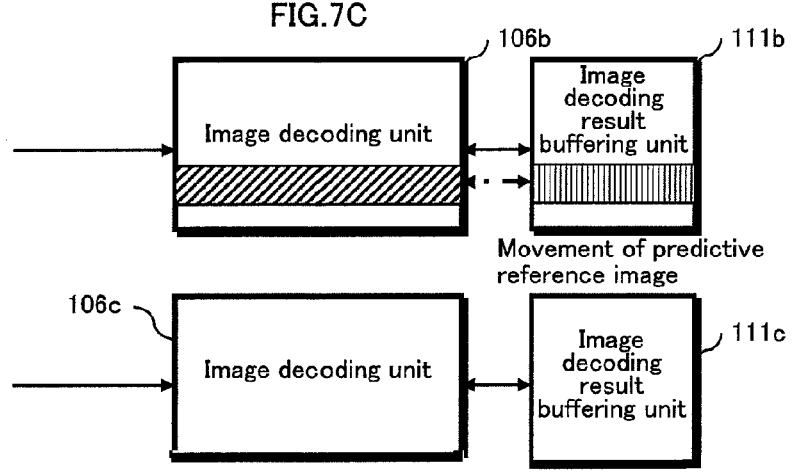

According to this, as shown in FIG. 7C, even if error concealment processing occurs, the necessity of performing image transfer processing between the image decoding unit 106b (Decoder#1) and the image decoding unit 106c (Decoder#2) is eliminated, and the error concealment processing does not influence the decoding processing time of the image decoding units 106b and 106c.

(2) Processing when the Second Error is Detected

If a second error that causes inability to continue decoding is detected by one of the second error detection units 109a to 109d, the image decoding unit that detected the second error skips decoding the second bit stream for which decoding could not be continued.

The segment allocation determination unit 102 performs allocation so that the processing times of the image decoding units are equal, when decoding processing is to be performed on all of the allocated second bit stream. Accordingly, when the second bit stream is skipped, decoding processing can be finished in a shorter time than in a case of performing decoding processing of the anticipated all of the second bit stream in the image decoding unit that detected the second error. For this reason, the decoding processing time of the next second bit stream in the image decoding units 106a to 106d becomes unequal.

In view of this, when the second error is detected in the second error detection units 109a to 109d, the segment allocation determination unit 102, taking into account the skipped portion of the second bit stream, allocates the next series of segments so that the decoding processing times of decoding in the image decoding units becomes equal.

Specifically, the second error detection units 109a to 109d notify a data amount ki (ki<mi) of the second bit stream consumed (decoded) until the second error is detected, to the segment allocation history/error detection position history management unit 105 via the error notification units 110a to 110d. The segment allocation history/error detection position history management unit 105 writes the data amount ki of the received second bit stream in the management table.

The management table 810 of FIG. 8B shows a case in which the second error was detected in the Decoder#3 during decoding of the slice#5 of the decode frame number#1. According to FIG. 8B, the data amount ki, which is the amount of the second bit stream consumed (decoded) by the Decoder#3 until the second error is detected, is 150 Kbits.

When determining an allocation of the next series of segments, the segment allocation determination unit 102 extracts the value of ki from the management table of the segment allocation history/error detection position history management unit 105. For an allocation mi/Pi (i=0, 1, 2, 3) when the second error is not detected, (mi−ki)/Pi is added, and the allocation of the next series of segments is determined so that the processing times of the image decoding units 106a to 106d are as equal as possible.

For example, when the second error is not detected, as shown in FIG. 6C, the slice#5 is allocated to the Decoder#3 at the time t0, and the slice#10 is allocated to the Decoder#3 at the time t1.

Figure 9:
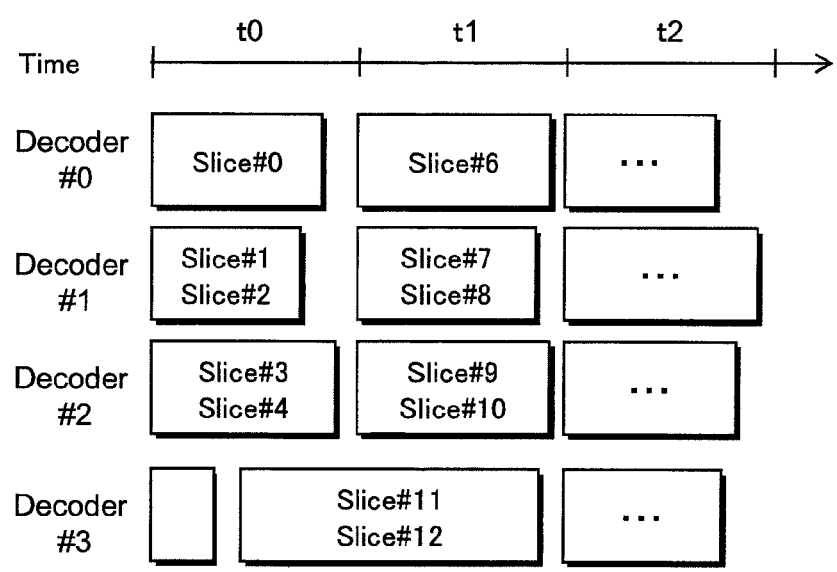
FIG. 9 shows exemplary segment division allocation when an error is detected.

In contrast is a case in which a second error that causes inability to continue decoding is detected in a slice#5 that is being decoded by the Decoder#3, when up to 150 Kbits has finished decoding. In this case, for example, as shown in FIG. 9, to correct the imbalance of processing between the Decoder#3 and the other decoders Decoder#0 to Decoder#2 at the time t1, the slice#11 and the slice#12 are allocated to the Decoder#3 at the time t1 to compensate for the amount by which the processing load of the Decoder#3 is reduced at the time t0.

Note that the segment allocation determination unit 102 may be configured to, when the allocation at time t1 has already been determined, correct the determined allocation according to the second error detection position.

Operation

Figure 10:
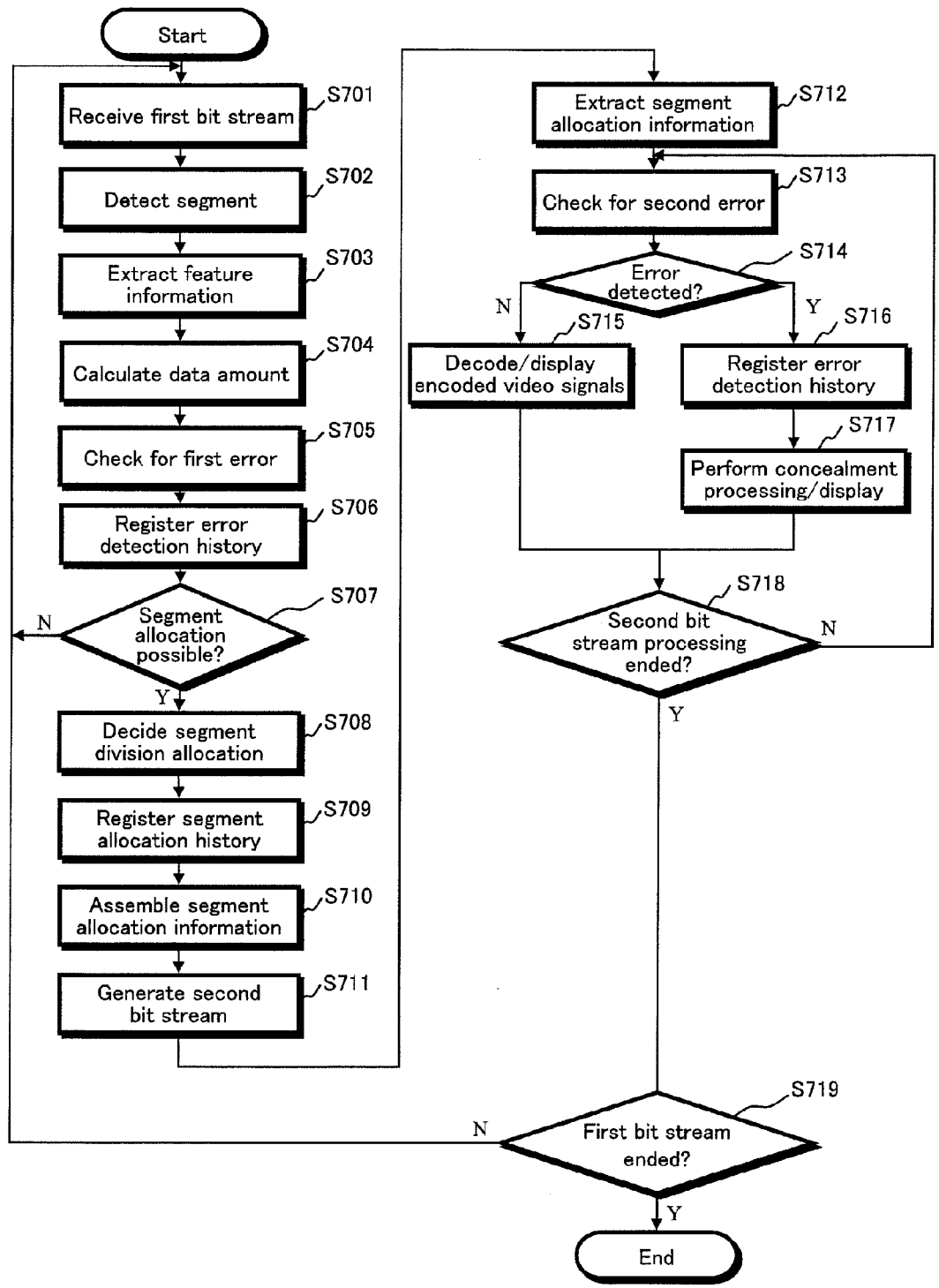
FIG. 10 is a flowchart showing operation of image decoding processing in embodiment 1 of the present invention.

Here, the operation of the image decoding device 1 is described with use of the flowchart of FIG. 10.

First, the data amount/feature information detection unit 101 receives a first bit stream 112 (step S701).

The data amount/feature information detection unit 101 detects the start code, and extracts a segment of the first bit stream 112 (step S702).

Furthermore, the data amount/feature information detection unit 101 extracts feature information by decoding and reading portions of the bit stream such as picture type, motion compensation information (intra-frame prediction, forward prediction, backward prediction, bi-directional prediction) etc. (step S703).

Thereafter, the data amount/feature information detection unit 101 skips decoding the bit stream until detecting the next start code. Upon detecting the next start code, the data amount/feature information detection unit 101 measures the data amount between the start codes, and calculates a segment data amount (step S704). By performing the above processing, the data amount/feature information detection unit 101 acquires the segment data amount and the feature information.

Next, a check for errors is performed by the first error detection unit 104 in the first bit stream 112 (step S705). Specifically, the first error detection unit 104 detects an error in the header information of a slice. In step S705, if the first error detection unit 104 detects an error, a detected error position (information that can be used to identify which slice includes the error) is registered in the segment allocation history/error detection position history management unit 105 as error detection history information (step S706).

Note that the processing from steps S702 to S704 and the processing from steps S705 to S706 may be performed simultaneously.

Next, the segment allocation determination unit 102 judges whether allocating segments to the image decoding units 106a to 106d is possible, based on the buffer amount of the first bit stream 112 being buffered, or whether the processing of the image decoding units 106a to 106d has finished (step S707).

In step S707, if the segments cannot be allocated to the image decoding units 106a to 106d (step S707:N), processing returns to step S701, and continues.

In step S707, when allocating segments to the image decoding units 106a to 106d is possible (step S707:Y), the segment allocation determination unit 102 reads the first bit stream 112 being buffered, and with use of with use of the segment data amount, the feature information, the capability information of the image decoding units 106a to 106d, as well as the allocation result, the first error detection position, and the second error detection position stored in the segment allocation history/error detection position history management unit 105, divides the first bit stream 112 into one or more slices, and determines the allocation of the segments to the image decoding units 106a to 106d (step S708). When the processing of step S708 is finished, the segment allocation information is obtained.

Here, although in step S708, the segment allocation determination unit 102 is described as performing segment division processing and segment allocation processing, the structure is not limited to this, and the data amount/feature information detection unit 101 may divide the first bit stream into slices, and store the slices in the buffering unit of the segment allocation determination unit 102. The device may be configured so that the slices divided by the segment allocation determination unit 102 are read from the buffering unit, and allocation processing is performed. That is to say, the device may be configured so that the data amount/feature information detection unit 101 performs segment division processing, and the segment allocation determination unit 102 performs segment allocation processing.

Note that the segment allocation determination unit 102 determines the division allocation of the next series of segments while the image decoding units 106a to 106d are performing decoding processing on the segments respectively allocated thereto.

Immediately after starting decoding processing on the first bit stream 112, the allocation results, the detection position of the first error, and the detection position of the second error for the segments that have already been decoded are not stored in the segment allocation history/error detection history management unit 105. Accordingly, immediately after starting decoding processing, the allocation processing is performed with use of only the segment data amounts, the feature information, and the capability information of the image decoding units 106a to 106d.

When decoding processing of an image to be the predictive reference image has finished after starting decoding processing on the first bit stream 112, if a first error is detected by the first error detection unit 104, the segment in which the first error was detected is allocated, with use of the segment data amount, feature information, allocation information, first error detection position, and second error detection position, to the image decoding unit, among the image decoding units 106a to 106d, that performed decoding processing on the segment including the already-decoded image that is to be the predictive reference image.

Accordingly, when reading a predictive reference image for error concealment processing in which another image is substituted for an image that cannot be decoded, since the predictive reference image is stored in the image decoding unit that performs the error concealment, it is not necessary in the error concealment processing to read the predictive reference image from another image decoding unit, and since data does not need to be transmitted when performing error concealment processing, the influence on the decoding processing of the other image decoding units can be suppressed.

Next, the segment allocation determination unit 102 stores the allocation result of the segments determined in step S708 in the segment allocation history/error detection position history management unit 105 (step S709).

Next, the encoded video signal regeneration unit 103 assembles the segment allocation information in a suitable format for decoding by the image decoding units 106a to 106d (step S710).

Next, the encoded video signal regeneration unit 103 inserts segment allocation information between the start code of the segment in the first bit stream, and the portion of the bit stream other than the start code, and generates the second bit streams 113a to 113d (step S711).

Next, the image decoding units 106a to 106d perform processing in parallel from step S712 to step S718.

Here, for convenience, the following describes the operation from step S712 to step S718, using the image decoding unit 106a as an example.

The image decoding unit 106a, upon receiving the second bit stream 113a, temporarily stores the received second bit stream 113a in the image decoding result buffering unit 111a.

The segment allocation information extraction unit 107a detects a start code of the second bit stream 113a, and extracts the segment allocation information positioned following the start code (step S712).

Next, the encoded video signal encoding/display unit 108a performs decoding processing on the remaining portion of the second bit stream 113a from which the segment allocation information has been extracted. The second error detection unit 109a reads the remaining bit stream from which the segment allocation information has been extracted, and checks for a second error that that causes inability to continue decoding (step S713).

If the second error detection unit 109a does not detect the second error (step S714:N), the encoded video signal decoding/display unit 108a, according to the segment allocation information extracted in step S712, reads the predictive reference image from the image decoding result buffering units 111a to 111d, performs decoding processing, writes the decoding results to the image decoding result buffering units 111a to 111d, and according to a display request to display the results on a display unit that is not depicted in the drawings, reads the decoding results from the image decoding result buffering units 111a to 111d, and outputs the image decoding results to the display unit (step S715).

If the second error detection unit 109a detects the second error (step S714:Y), the error notification units 110a to 110d notify the detected error detection position to the segment allocation history/error detection position history management unit 105 as error detection history information.

When the notification is received, the segment allocation history/error detection position history management unit 105 registers the second error position information in the management table (step S716).

Thereafter, the encoded video signal decoding/display unit 108a reads the predictive reference image, in order to perform error concealment processing by substituting another image for the image that could not be decoded due to the second error, and writes the predictive reference image to the image decoding result buffering unit 111a. Also, according to a display request from the display unit that is not depicted in the drawings, the encoded video signal decoding/display unit 108a reads the decoding results from the image decoding result buffering units 111a to 111d, and outputs the decoding results to the display unit (step S717).

Thereafter, the image decoding unit 106a judges whether the decoding processing of the second bit stream 113a has ended. If the decoding processing of the second bit stream 113a has not ended (step S718:N), processing returns to step S713, and processing continues. If the decoding processing of the second bit stream 113a has finished (step S718:Y), processing proceeds to step S719.

Next, the data amount/feature information detection unit 101 judges whether all the decoding processing has ended for the first bit stream 112. If all the decoding processing has ended (step S719:Y), the image decoding device 1 ends the processing. If the processing has not ended (step S718:N), processing returns to step S701, the image device 1 receives the first bit stream 112, and continues the decoding processing.

Note that while the image decoding unit 106a is performing decoding processing of the second bit stream, the segment allocation determination unit 102 determines the division allocation of the next series of segments. That is to say, the image decoding unit 1 performs the processing of step S701 to step S711, and the processing of step S712 to step S717 in parallel.

Overview of Embodiment 1

As described above, according to the present embodiment, processing efficiency can be improved by causing the processing times of the image decoding units to be as equal as possible by allocating segments to the image decoding units according to the data amounts for each of the segments of the digitally encoded video signals and the specific processing ability of each of the image processing units.

Also, the processing efficiency of the image decoding device 1 can be improved by determining the allocation so that if the first error is detected, the segments are allocated so that the data transfer for error concealment processing does not influence other image decoding units, and if the second error is detected, the segments are allocated so that an imbalance of the processing times resulting from skipping the digitally encoded video signal is corrected by causing the processing times to be as equal as possible when the next segment allocation is determined.

Furthermore, according to the present embodiment, segment allocation information indicating the segments allocated to the image decoding units is added to the one or more segments into which the first bit stream 112 has been divided, thus generating the second bit streams 113a to 113d. By supplying the second bit streams 113a to 113d to the image decoding units, the image decoding units extract the added segment allocation information, and based on the extracted segment allocation information, by performing the decoding processing, the error concealment processing, and the display processing, existing systems can be expanded into the system of the present invention without changing the structure greatly.

Note that although in the present embodiment, the image decoding device is configured to perform decoding processing of a single bit stream that exceeds the processing ability of a single image decoding unit, the present invention is not limited to this, and the image decoding device may be configured to perform decoding processing of a plurality of bit streams that exceed the processing ability of a single image decoding unit.

In this case, where a horizontal size of the image frame size j (j=1, 2, 3, . . . ) is sj, a vertical size of the plurality of bit streams is tj, and a frame rate of the plurality of bit streams is uj, a macroblock number lj that is the number of macroblocks, in the bit stream j, on which decoding processing can be performed in one second, is sj/16×tj/16×uj.

For this reason, to perform decoding processing on a plurality of bit streams that exceed the processing ability of a single image decoding unit, where the total of the macroblock numbers lj that is the number of macroblocks, in the bit stream j, on which decoding processing can be performed in one second, is L, and the total of the processing abilities of the plurality of image decoding units is Q, it is necessary to reserve a number of image decoding units so that L/Q<1.

Where a segment data amount of a segment created as a result of the division of the plurality of bit streams j is mji (i being the number of segments created as a result of the division, and corresponding to the number 1 to n of image decoding units that perform processing in parallel), the segments are allocated to the image decoding units so that mj0/P0, mj1/P1, . . . , mji/Pi are as equal as possible, allocation can be performed so that the processing allocated to the image decoding units as equal as possible.

Note that the image decoding device 1 in the present embodiment may be realized on a single semiconductor integrated circuit.

Also, all the constituent elements of the image decoding device 1 except for the image decoding result buffering units 111a to 111d may be realized on a single semiconductor integrated circuit.

Also, the image decoding units 106a to 106d may be realized on a single semiconductor integrated circuit, and the data amount/feature information detection unit 101, the segment allocation determination unit 102, the encoded video signal regeneration unit 103, the first error detection unit 104, and the segment allocation history/error detection position history management unit 105 may also be realized on a single semiconductor integrated circuit.

Also, the image decoding units 106a to 106d are realized by 4 different semiconductor integrated circuits, and the data amount/feature information detection unit 101, the segment allocation determination unit 102, the encoded video signal regeneration unit 103, the first error detection unit 104, and the segment allocation history/error detection position history management unit 105 may be realized on a single semiconductor integrated circuit.

Also, in the portion enclosed by a solid line a in FIG. 1 (that is to say, the data amount/feature information detection unit 101, the segment allocation determination unit 102, the encoded video signal regeneration unit 103, the first error detection unit 104, the segment allocation history/error detection position history management unit 105, the image decoding unit 106a, and the image decoding result buffering unit 111a) may be realized on one semiconductor integrated circuit.

Also, the following pairs may each be realized as a single print substrate: the image decoding unit 106a and the image decoding result buffering unit 111a; the image decoding unit 106b and the image decoding result buffering unit 111b; the image decoding unit 106c and the image decoding result buffering unit 111c; the image decoding unit 106d and the image decoding result buffering unit 111d.

Also, the image decoding units 106a to 106d and the image decoding result buffering units 111a to 111d may be realized by an individual system such as an STB (Set Top Box) or a DVD recorder, and the individual system may be connected to a network.

Also, the present invention, in addition to the constituent elements shown in FIG. 1, may be configured to include a display device that displays images output from the encoded video signal encoding/display units 108a to 108d.

Embodiment 2

Here, an image decoding device 2 pertaining to embodiment 2 of the present invention is described.

Structure

Figure 11:
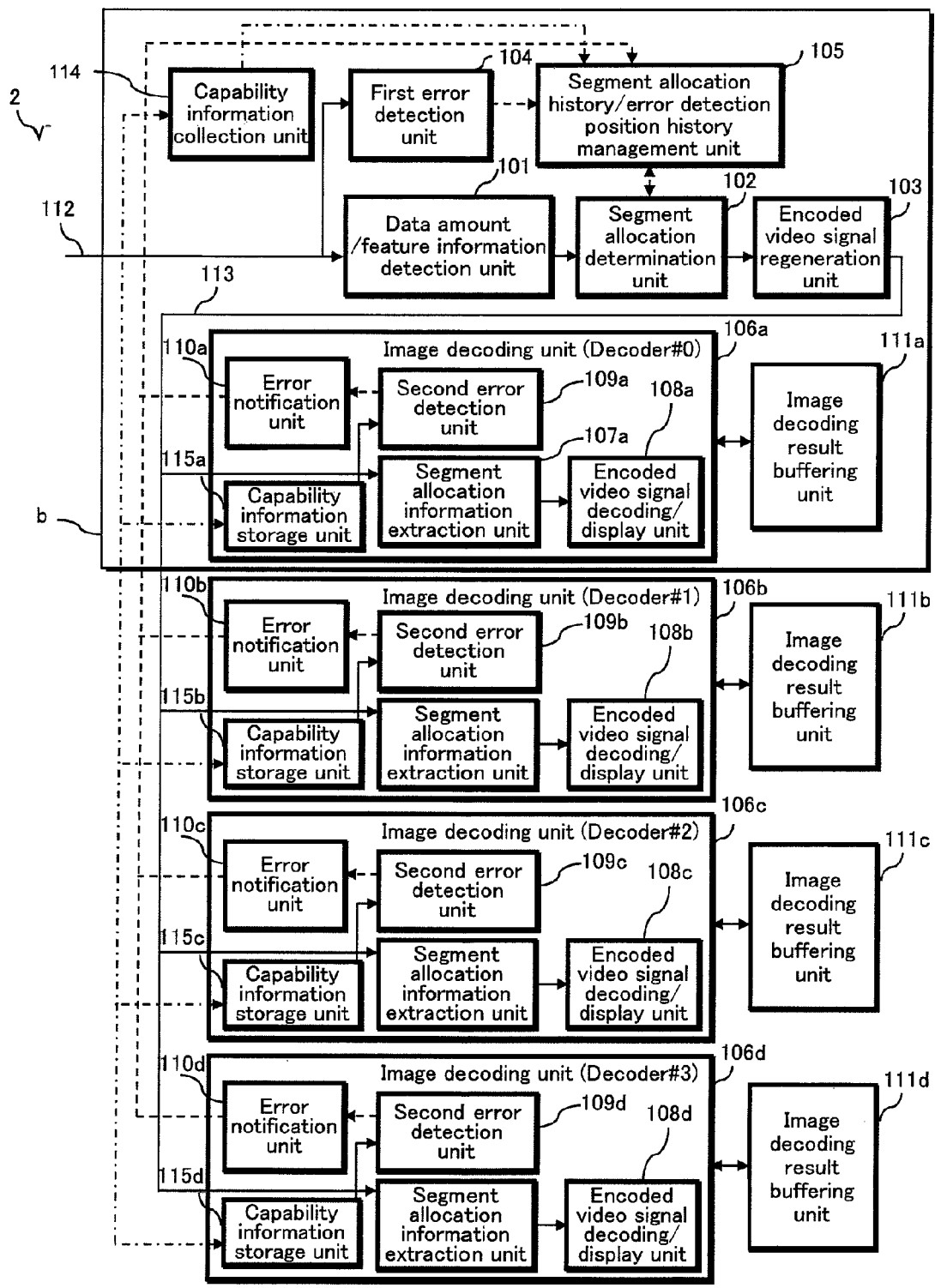
FIG. 11 is a block diagram showing a structure of an image decoding device 2 pertaining to embodiment 2 of the present invention.

FIG. 11 is a block diagram showing a structure of an image decoding device 2 pertaining to embodiment 2 of the present invention. In FIG. 11, structural elements having the same functions as those in FIG. 1 have been given the same reference symbols, and description thereof is omitted. The image decoding device 2 includes a capability information collection unit 114 and capability information storage units 115a to 115d.

In the present embodiment, the number of image decoding units used in the image decoding device 2 is not decided in advance. The image decoding device 2 selects an image decoding unit to use for decoding processing according to the encoding amount of the first bit stream 112 and the processing ability of the image decoding units, and after reserving the number of image decoding units necessary for image decoding processing, the image decoding device 2 performs decoding processing of the first bit stream 112. The following describes the details of this processing.

In the semiconductor integrated circuits of recent years, and particularly in microprocessors, a serial number or an ID number is often embedded in the semiconductor integrated circuit. In view of this, in the present embodiment, capability information of the image decoding units 106a to 106d is embedded in the image decoding units 106a to 106d as unique information, similarly to embedding a serial number or an ID number.

The capability information of the image decoding units 106a to 106d is embedded in the capability information storage units 115a to 115d in advance. The capability information collection unit 114 accesses the capability information storage units of the image decoding units 106a to 106d via an external interface, and extracts the capability information of the image decoding units 106a to 106d.

Alternatively, the capability information collection unit 114 transmits the capability information transmission request signal to the image information units 106a to 106d, and upon receiving a capability transmission request signal, the image decoding units 106a to 106d extract the capability information from the capability information storage units 115a to 115d, and transmits the capability information to the capability information collection unit 114.

The capability information collection unit 114 outputs the capability information of the acquired image decoding units 106a to 106d to the segment allocation determination unit 102, and the segment allocation determination unit 102 stores therein the capability information received from the capability information collection unit 114.

Also, in the present embodiment, to determine the number of image decoding units necessary for performing decoding processing on the first bit stream 112, the data amount/feature information detection unit 101, first, detects a start code in the first bit stream, and then decodes and reads a portion of the bit stream, and extracts a frame size and a frame rate of the first bit stream 112.

The processing ability necessary for decoding the first bit stream 112 is calculated based on the frame size and frame rate of the first bit stream 112, and the frame size and frame rate of the corresponding images in the image decoding units.

Specifically, where the horizontal size of the image frame size is s, the vertical size is t, and the frame rate is u, a macroblock number 1 that is the number of macroblocks on which processing can be performed in one second is s/16×t/16×u.

Similarly, where the horizontal size of the frame size of the corresponding image defined in the specifications of an image decoding unit i is si, the vertical size is ti, and the corresponding frame rate is ui, the processing ability Pi (i being the number of image decoding units that perform processing in parallel), which is the processing ability of the number of macroblocks on which decoding processing can be performed in one second, is si/16×ti/16×ui.

In view of this, to perform decoding processing of a single bit stream that exceeds the processing ability of a single image decoding unit, where Q is a summation of si/16×ti/16×ui that is the processing ability of the plurality of decoding units, one or more image decoding units are selected so that 1/Q<1, and the necessary number of image decoding units are retained.

After retaining the number of image decoding units to be used for the image processing, the image decoding device performs decoding processing similarly to the image decoding device 1 pertaining to embodiment 1.

Operation

Figure 12:
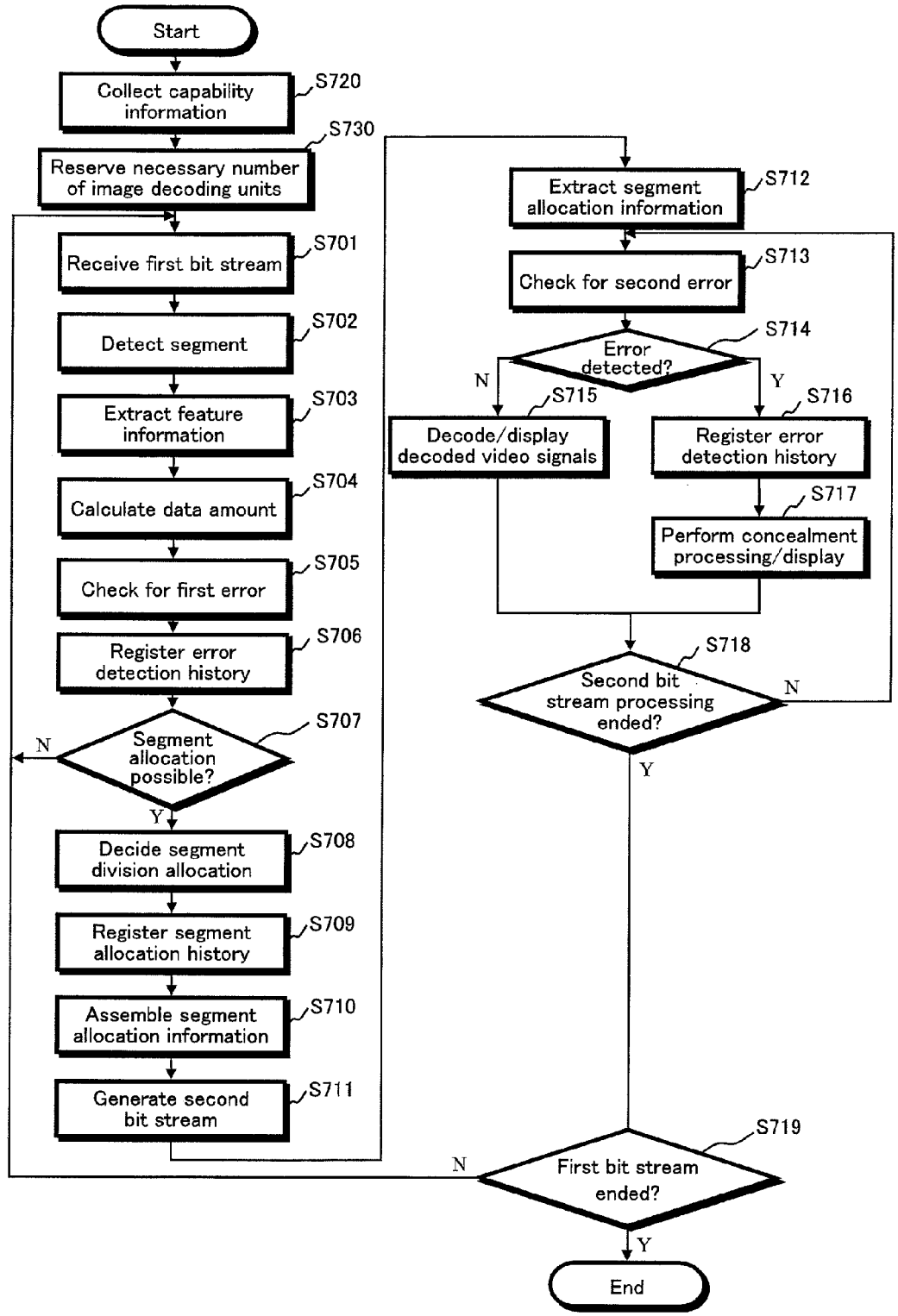
FIG. 12 is a flowchart showing operation of image decoding processing in embodiment 2 of the present invention.

FIG. 12 is a flowchart showing operation by the image decoding device 2 of embodiment 2 of the present invention.

First, the capability information collection unit 114 acquires capability information respectively from the image decoding units 106a to 106d, and outputs the acquired capability information to the segment allocation determination unit 102. The segment allocation determination unit 102 stores therein the capability information of the image decoding units 106a to 106d (step S720).

Next, to calculate the number of image decoding units necessary for performing decoding processing on the first bit stream 112 in the data amount/feature information detection unit 101, the data amount/feature information detection unit 101 decodes and reads a portion of the bit stream, and extracts a frame size and a frame rate of the first bit stream.

Based on the frame size and the frame rate of the first bit stream, and the corresponding image frame size and frame rate of the image decoding units, the image decoding device 2 calculates the processing ability necessary for decoding the first bit stream 112, and reserves the number of image decoding units necessary for performing decoding processing on the first bit stream 112 (step S730).

Note that step S720 and step S730 are not limited to being performed in that order. The image decoding device 2 may perform steps S720 and S730 simultaneously.

Since the processing from step S701 to S719 is similar to embodiment 1, the details are omitted here.

Overview of Embodiment 2

As described above, in the present embodiment, before allocating the second bit stream to the image decoding units, by analyzing the processing abilities of the image decoding units, the frame size and the frame rate of the first bit stream, the number of necessary image decoding units is calculated, the necessary number of image decoding units is reserved, and the second bit stream is allocated to the image decoding units. Therefore, according to the present embodiment, by adding a new image processing unit to a system that has been configured once, the processing capability can be improved.

Also, in the present embodiment, similarly to embodiment 1, the processing efficiency of the image decoding device 2 can be improved by determining the allocation so that if the first error is detected, the segments are allocated so that a data transfer for error concealment processing does not influence other image decoding units, and if the second error is detected, the segments are allocated so that an imbalance of the processing times resulting from skipping the digitally encoded video signal is corrected by causing the processing times to be as equal as possible when the next segment allocation is determined.

Note that in the present embodiment, as capability information of the image decoding units, the corresponding image frame sizes, frame rates, and the number of macroblocks on which decoding processing can be performed in one second, may be used.

Note that, although in the present embodiment, the image decoding device is configured to perform decoding processing on a single bit stream that requires a processing ability that exceeds the processing ability of a single image decoding unit, the present embodiment is not limited to this, and the image decoding device may be configured to perform decoding processing on a plurality of bit streams that exceed the processing ability of a single image decoding unit. Since the details thereof are described in embodiment 1, the description is omitted here.

Note that the image decoding device 2 in the present embodiment may be realized as a single semiconductor integrated circuit.

Also, all the constituent elements of the image decoding device 2 except for the image decoding result buffering units 111a to 111d may be realized on a single semiconductor integrated circuit.

Also, the image decoding units 106a to 106d may be realized as a single semiconductor integrated circuit, and the data amount/feature information detection unit 101, the segment allocation determination unit 102, the encoded video signal regeneration unit 103, the first error detection unit 104, the segment allocation history/error detection position history management unit 105, and the capability information collection unit 114 may be realized on a single semiconductor integrated circuit.

Also, the image decoding units 106a to 106d may be realized separately as four different semiconductor integrated circuits, and the data amount/feature information detection unit 101, the segment allocation determination unit 102, the encoded video signal regeneration unit 103, the first error detection unit 104, the segment allocation history/error detection position history management unit 105, and the capability information collection unit 114 may be realized as a single semiconductor integrated circuit.

Also, the portion enclosed by a solid line b in FIG. 11 (that is to say, the data amount/feature information detection unit 101, the segment allocation determination unit 102, the encoded video signal regeneration unit 103, the first error detection unit 104, the segment allocation history/error detection position history management unit 105, the capability information collection unit 114, the image decoding unit 106a, and the image decoding result buffering unit 111a), may be realized as one semiconductor integrated circuit.

Also, the following pairs may respectively be realized as one print substrate each: the image decoding unit 106a and the image decoding result buffering unit 111a; the image decoding unit 106b and the image decoding result buffering unit 111b; the image decoding unit 106c and the image decoding result buffering unit 111c; the image decoding unit 106d and the image decoding result buffering unit 111d.

Also, the image decoding units 106a to 106d and the image decoding result buffering units 111a to 111d may be realized as a separate system such as an STB (Set Top Box) or a DVD recorder, and may be connected to the separate system via a network.

Also, the present invention may be configured to include a display unit that displays images output by the encoded video signal decoding/display units 108a to 108d, in addition to the constituent elements shown in FIG. 11.

Embodiment 3

Here, the following describes an image decoding system 3 pertaining to embodiment 3 of the present embodiment.

Figure 13A:
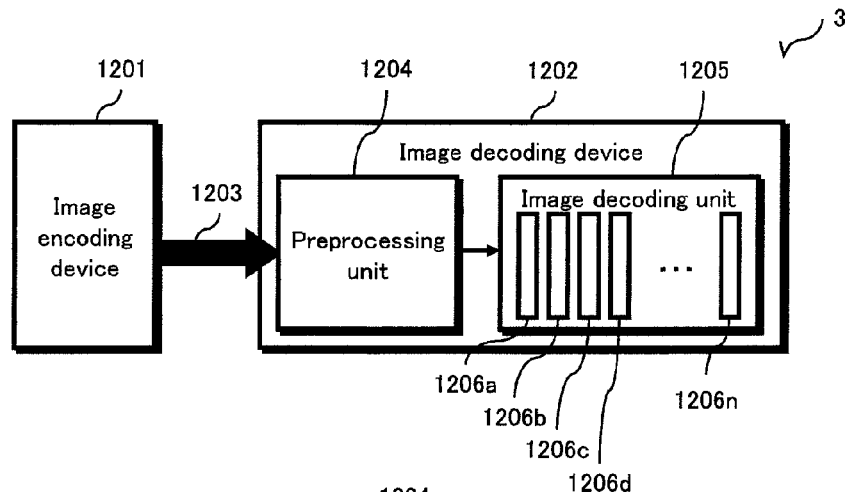
FIGS. 13A, 13B, and 13C are structural diagrams of an image decoding system 3 pertaining to embodiment 3 of the present invention.
Figure 13B:
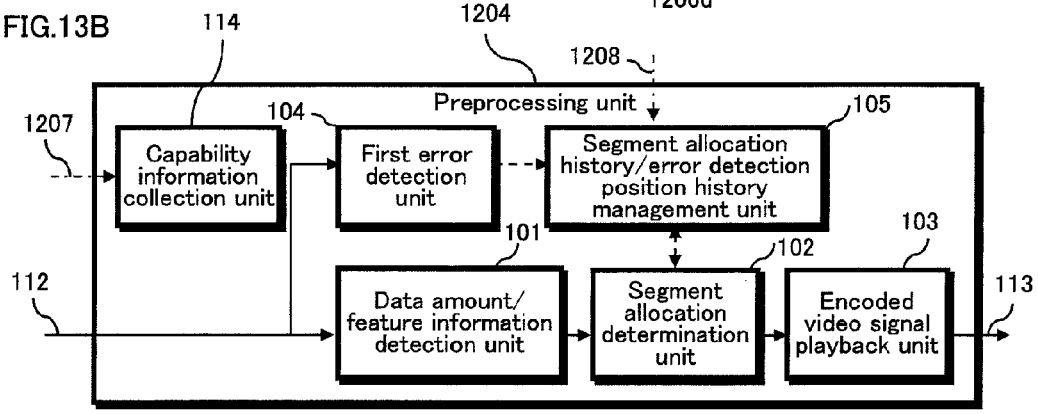
Figure 13C:
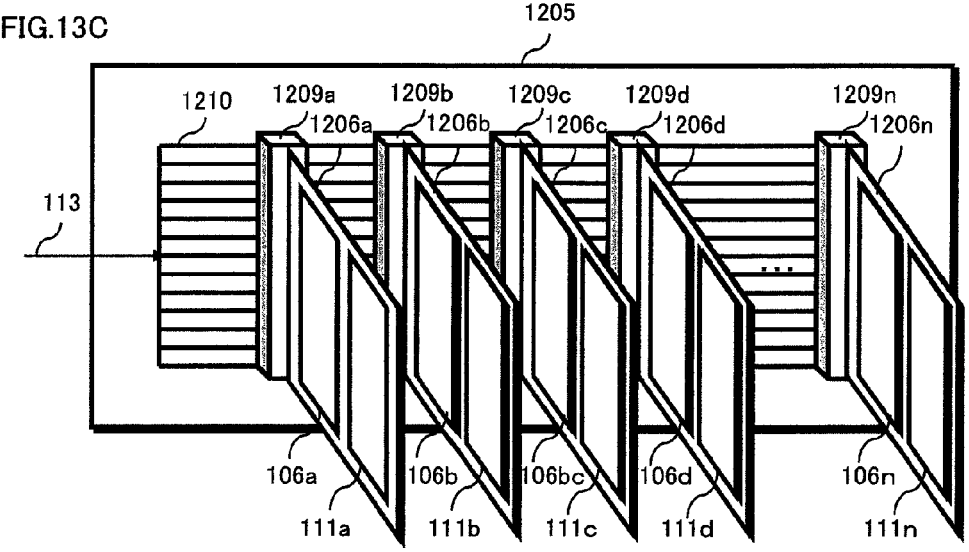

FIGS. 13A, 13B, and 13C show a structure of an image decoding system 3 pertaining to embodiment 3 of the present invention. Note that in FIGS. 13A, 13B, and 13C, constituent elements that are the same as in FIG. 1 and FIG. 11 use the same reference notations, and descriptions thereof are omitted.

As shown in FIG. 13A, the image decoding system 3 is composed of an image encoding device 1201, an image decoding device 1202, and a transmission path 1203. Here, the overall structure of the image decoding device 1202 has an identical structure to the image decoding device 1 shown in FIG. 1.

The image encoding device 1201 generates a digitally encoded video signal (first bit stream 112), and transmits the generated first bit stream 112 to the image decoding device 1202 via the transmission path 1203.

The image decoding device 1202 is composed of a preprocessing unit 1204 and an image decoding unit 1205. The image decoding unit 1205 includes a plurality of substrates 1206a, 1206b, . . . , 1206n.

FIG. 13B is a block diagram showing a structure of the preprocessing unit 1204. As shown in FIG. 13B, the preprocessing unit 1204 includes the data amount/feature information detection unit 101, the segment allocation determination unit 102, the encoded video signal regeneration unit 103, the first error detection unit 104, the segment allocation history/error detection position history management unit 105, and the capability information collection unit 114.

The capability information collection unit 114 of the preprocessing unit 1204 collects capability information from the image decoding units 106a to 106n via the external connection bus 1207. Also, the preprocessing unit 1204, via an error position notification signal 1208, notifies the detection of the second error in the image decoding units 106a to 106n to the segment allocation history/error detection position history management unit 105.

Since the other constituent elements have the same functions as the constituent elements of the image decoding device 1 pertaining to embodiment 1 and the image decoding device 2 pertaining to embodiment 2, description thereof is omitted here.

FIG. 13C is an outline view showing a structure of the image decoding unit 1205. As shown in FIG. 13C, the image decoding unit 1205 includes a plurality of substrates 1206a to 1206n, an image decoding bus 1210 for data transmission, and a plurality of sockets 1209a to 1209n to which the plurality of substrates 1206a to 1206n can be attached and from which the plurality of substrates 1206a to 1206n can be removed.

The substrates 1206a to 1206n are composed of, respectively, image decoding units 106a to 106n that perform processing in parallel on the second bit streams 113a to 113n, second bit streams 113a to 113n for each of the image decoding units 106a to 106n, and image decoding result buffering units 111a to 111n that store the image decoding results.

Since the image decoding units 106a to 106n have the same internal structures and functions as the image decoding units 106a to 106d shown in FIG. 1, respectively, description thereof is omitted here.

According to the present embodiment, by sharing the preprocessing unit 1204, and attaching and removing the plurality of substrates, to the image decoding unit 1205, an image decoding system 3 that can easily be expanded or changed can be provided.

Furthermore, according to the present embodiment, similarly to embodiment 1 and embodiment 2, the overall processing efficiency can be improved by making the processing times of the image decoding units 106a to 106n as equal as possible, by allocating the processing of the segments according to the data amount of the digitally encoded video signal for each segment, and the specific processing abilities of the image decoding units 106a to 106n.

Also, in the present embodiment, similarly to embodiment 1 and embodiment 2, the processing efficiency of the image decoding system 3 can be improved by determining the allocation so that if the first error is detected, the segments are allocated so that a data transfer for error concealment processing does not influence other image decoding units, and if the second error is detected, the segments are allocated so that an imbalance of the processing times resulting from skipping the digitally encoded video signal is corrected by causing the processing times to be as equal as possible when the next segment allocation is determined.

Note that in the present embodiment, the preprocessing unit 1204 may be realized as a single semiconductor integrated circuit.

Also, the following pairs may each be realized as a single print substrate: the image decoding unit 106a and the image decoding result buffering unit 111a; the image decoding unit 106b and the image decoding result buffering unit 111b; the image decoding unit 106c and the image decoding result buffering unit 111c; the image decoding unit 106d and the image decoding result buffering unit 111d; . . . ; the image decoding unit 106n and the image decoding result buffering unit 111n.

Also, the transmission path 1203 may be connected by a network connection, instead of a bus.

Also, the present invention may include, in addition to the structural elements in FIG. 13, a display, device that displays an image.

The image decoding device pertaining to the present invention can be used in the industries of manufacture and sale of DTVs, DVD recorders, BD recorders, etc., as technology for efficiently decoding video signals that have been encoded according to the MPEG-2 standard, the H.264/AVC standard, the VC-1 standard, etc.

The invention claimed is:

1. An image decoding device, comprising:

a plurality of image decoding units connected in parallel and operable to perform decoding processing on an encoded first video signal which is segmented into a plurality of segments; and an allocation control unit operable to, using different methods in accordance with whether an error is detected, determine which of the image decoding units to allocate each of the segments, based on a data amount of each of the segments, so that periods of time required for processing by the image decoding units are substantially equal, and allocate one or more of the segments to each of the image decoding units based on the allocation which is determined, wherein, if an error is detected, the allocation control unit determines which of the image decoding units to allocate each of the segments to compensate for a reduced processing load of an image decoding unit to which a segment including the error is allocated occurring due to skipping of the segment including the error.

2. The image decoding device of claim 1 comprising:

an error detection unit operable to detect an error in the first video signal;

the plurality of image decoding units each having a specific processing ability and being operable to decode the one or more segments allocated by the allocation control unit; and a storage unit for storing an allocation result that is the result of the allocation performed by the allocation control unit, wherein the allocation control unit determines which of the image decoding units to allocate each of the segments, according to the processing abilities of the image decoding units and the data amount of each of the segments, so that periods of time required for processing by the image decoding units are substantially equal, and the allocation control unit, when an error is detected by the error detection unit, and a reference segment for the segment including the detected error has already been decoded by any of the image decoding units, (i) acquires an allocation result of the reference segment from the storage unit, (ii) and after performing control to allocate the segment including the error to an image decoding unit to which the reference segment has been allocated, (iii) determines which of the image decoding units to allocate each of the segments so that the periods of time required for processing by the image decoding units are substantially equal, and allocates the one or more segments to each of the image decoding units based on the allocation which is determined.

3. The image decoding device of claim 2, wherein each of the image decoding units includes:

a decoding unit operable to perform decoding processing on the allocated one or more segments, an error detection unit operable to detect an error in a segment when the decoding unit is performing decoding processing on the segment, and an error notification unit operable to, when the error detection unit detects the error, notify the position of the detected error to the storage unit, the storage unit further stores the position of the error notified by the error notification unit, and the allocation control unit, when the position of the error has been stored in the storage unit, in accordance with the position of the error and the processing abilities of the image decoding units, allocates the one or more segments to the image decoding units, determines which of the image decoding units to allocate each of the segments so that the periods of time required for processing by the image decoding units are substantially equal, and allocates the one or more segments to each of the image decoding units based on the allocation which is determined.

4. The image decoding device of claim 3 further comprising:

an extraction unit operable to extract data amounts and feature information of the segments from the first video signal, wherein the allocation control unit determines which of the image decoding units to allocate each of the segments, with use of the data amounts and feature information of the segments extracted by the extraction unit, so that the periods of time required for processing by the image decoding units are substantially equal, and allocates the one or more segments to each of the image decoding units based on the allocation which is determined.

5. The image decoding device of claim 4, wherein the allocation control unit, for each of the image decoding units, generates a second video signal composed of (i) allocation information in which is written an allocation of segments to the plurality of image decoding units, and (ii) one or more segments allocated to the decoding units, and outputs the generated second video signal to the image decoding units.

6. The image decoding device of claim 5 further comprising:

a plurality of buffering units corresponding to the image decoding units, operable to store the second video signals, that the image decoding units received from the allocation control unit, and a decoding result decoded by the image decoding units, wherein the image decoding units extract the allocation information from the second video signal, and the image decoding units, according to the extracted allocation information, acquire a necessary decoding result from the plurality of buffering units, and perform (a) decoding processing by the image decoding units, (b) error concealment processing when an error is detected by the error detection unit, and (c) display processing to output an image.

7. The image decoding device of claim 6, wherein the error detection unit is operable to set a header portion of each segment as an error detection target, and to detect an error that causes inability to continue decoding the header portion, and the error detection units included in the image decoding units are operable to set texture data of each segment as an error detection target, and to detect an error that causes inability to continue decoding the texture data.

8. The image decoding device of claim 2 further comprising:

an extraction unit operable to extract a data amount of the first video signal;

an acquisition unit operable to acquire capability information pieces each indicating a respective processing ability of one of the plurality of image decoding units, and a selection unit operable to select one or more image decoding units to be used in decoding processing of the first video signal, in accordance with the acquired plurality of capability information pieces, and the data amount of the first video signal, wherein the image decoding units further include a capability information storage unit for storing the capability information pieces.

9. An image decoding system including an image decoding device and an image output device, the image decoding device including:
an error detection unit operable to detect an error in an encoded first video signal which is segmented into a plurality of segments,
a plurality of image decoding units each having a specific processing ability, to each of which one or more different segments among the plurality of segments included in the first video signal are allocated, each of which being operable to decode and output the allocated one or more segments,
an allocation control unit operable to, using different methods in accordance with whether an error is detected, determine which of the image decoding units to allocate each of the segments, based on the processing abilities of the image decoding units and a data amount of each of the segments, so that periods of time required for processing by the image decoding units are substantially equal, and allocate the one or more segments to each of the image decoding units based on the allocation which is determined, and
a storage unit for storing an allocation result that is a result of the allocation performed by an allocation control unit, wherein
the allocation control unit, when an error is detected by the error detection unit, and a reference segment for a segment including the detected error has already been decoded by any of the image decoding units, (i) acquires an allocation result of the reference segment from the storage unit, (ii) and after performing control to allocate the segment including the error to an image decoding unit to which the reference segment has been allocated, (iii) determines which of the image decoding units to allocate each of the segments so that periods of time required for processing by the image decoding units are substantially equal, and allocates the one or more segments to each of the image decoding units based on the allocation which is determined, and
the image output device displays an image output from the plurality of image decoding units.

10. The image decoding system of claim 9, wherein the image decoding device further comprises:
an extraction unit operable to extract a data amount of the first video signal;
an acquisition unit operable to acquire capability information pieces each indicating a respective processing ability of one of the plurality of image decoding units, and
a selection unit operable to select one or more image decoding units to be used in decoding processing of the first video signal, in accordance with the acquired plurality of capability information pieces, and the data amount of the first video signal, wherein
the image decoding units include a capability information storage unit for storing the capability information pieces.

11. An image decoding method, used in an image decoding device, for performing decoding processing on a digitally encoded first video signal which is segmented into a plurality of segments, with use of a plurality of image decoding units connected in parallel, wherein the image decoding device includes:

a plurality of image decoding units, each of which has a specific processing ability, to which one or more different segments among the plurality of segments included in the first video signal are allocated, operable to decode the allocated one or more segments, and
a storage unit for storing an allocation result of an allocation control step,
the image decoding method comprising the steps of:
detecting an error in the first video signal; and
performing allocation control to, using different methods in accordance with whether an error is detected, determine which of the image decoding units to allocate each of the segments, based on the processing abilities of the image processing decoding units and a data amount of each of the segments, so that the periods of time required for processing by the image decoding units are substantially equal, and allocate the one or more segments to each of the image decoding units based on the allocation which is determined, wherein
the allocation control step is performed by, when an error is detected in the error detection step, and a reference segment for a segment including the detected error has already been decoded by any of the image decoding units, (i) acquiring an allocation result of the reference segment from the storage unit, (ii) and after performing control to allocate the segment including the error to an image decoding unit to which the reference segment has been allocated, (iii) determining which of the image decoding units to allocate each of the segments so that the periods of time required for processing by the image decoding units are substantially equal, and allocating the one or more segments to each of the image decoding units based on the allocation which is determined.

12. The image decoding method of claim 11 wherein the image decoding units include capability information storage units for storing therein capability information pieces each indicating a respective processing ability,
the image decoding method further including the steps of:
extracting a data amount of the first video signal,
acquiring capability information pieces each indicating a respective processing ability of one of the plurality of image decoding units, and
selecting one or more image decoding units to be used in decoding processing of the first video signal, in accordance with the acquired plurality of capability information pieces, and the data amount of the first video signal.

13. An integrated circuit used in an image decoding device that performs decoding processing on an encoded first video signal, which is segmented into a plurality of segments, with use of a plurality of image decoding units connected in parallel, comprising:
an error detection unit operable to detect an error in the first video signal,
the plurality of image decoding units each having a specific processing ability, to each of which one or more different segments among the plurality of segments included in the first video signal are allocated, each of the plurality of image decoding units being operable to decode the allocated one or more segments,
an allocation control unit operable to,using different methods in accordance with whether an error is detected, determine which of the image decoding units to allocate each of the segments, based on a data amount of each of the segments, so that periods of time required for processing by the image decoding units are substantially equal, and allocate the one or more segments to the image decoding units based on the allocation which is determined, and a storage unit for storing an allocation result that is a result of the allocation performed by the allocation control unit, wherein the allocation control unit, when an error is detected by the error detection unit, and a reference segment for a segment including the detected error has already been decoded by any of the image decoding units, (i) acquires an allocation result of the reference segment from the storage unit, (ii) and after performing control to allocate the segment including the error to an image decoding unit to which the reference segment has been allocated, (iii) determines which of the image decoding units to allocate each of the segments so that the periods of time required for processing by the image decoding units are substantially equal, and allocates the one or more segments to each of the image decoding units based on the allocation which is determined.

14. The integrated circuit of claim 13, further comprising an extraction unit operable to extract a data amount of the first video signal;

an acquisition unit operable to acquire capability information pieces each indicating a respective processing ability of one of the plurality of image decoding units, and a selection unit operable to select one or more image decoding units to be used in decoding processing of the first video signal, in accordance with the acquired plurality of capability information pieces, and the data amount of the first video signal, wherein the image decoding units include a capability information storage unit for storing the capability information pieces.

* * * * *